United States Patent
Su et al.

(10) Patent No.: US 12,254,635 B2
(45) Date of Patent: Mar. 18, 2025

(54) IMAGE DISTORTION CORRECTION METHOD AND APPARATUS

(71) Applicant: Huawei Technologies Co., Ltd., Shenzhen (CN)

(72) Inventors: Chen Su, Shenzhen (CN); Huanwen Peng, Shenzhen (CN); Shuiran Peng, Shanghai (CN); Yihua Zeng, Shenzhen (CN); Shisheng Zheng, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 421 days.

(21) Appl. No.: 17/698,650

(22) Filed: Mar. 18, 2022

(65) Prior Publication Data
US 2022/0207747 A1    Jun. 30, 2022

Related U.S. Application Data

(63) Continuation of application No. PCT/CN2020/114400, filed on Sep. 10, 2020.

(30) Foreign Application Priority Data

Sep. 18, 2019 (CN) .......................... 201910896549.6

(51) Int. Cl.
   *G06T 7/12*    (2017.01)
   *G06T 3/18*    (2024.01)
   (Continued)

(52) U.S. Cl.
   CPC .................. *G06T 7/12* (2017.01); *G06T 3/18* (2024.01); *G06T 3/40* (2013.01); *G06T 3/60* (2013.01);
   (Continued)

(58) Field of Classification Search
   CPC . G06T 5/80; G06T 7/194; G06T 2207/30201; G06T 5/00; G06T 7/11;
   (Continued)

(56) References Cited

U.S. PATENT DOCUMENTS

2007/0025723 A1* 2/2007 Baudisch ............... H04N 5/262
                                                                 348/E5.051
2013/0321569 A1    12/2013 Agarwala et al.
                                 (Continued)

FOREIGN PATENT DOCUMENTS

| CN | 101673394 B | 3/2010 |
| CN | 103996172 A | 8/2014 |

(Continued)

OTHER PUBLICATIONS

Robert Carroll, Maneesh Agrawal, and Aseem Agarwala. 2009. Optimizing content-preserving projections for wide-angle images. ACM Trans. Graph. 28, 3, Article 43 (Aug. 2009), 9 pages. (Year: 2009).*

(Continued)

*Primary Examiner* — Sumati Lefkowitz
*Assistant Examiner* — Aaron Joseph Sorrin
(74) *Attorney, Agent, or Firm* — Conley Rose, P.C.

(57) ABSTRACT

An image distortion correction method and an apparatus, where the method includes: performing optical distortion correction on a collected source image to obtain a first corrected image, where the first corrected image includes a background region and a portrait in which stretching deformation occurs, and where the portrait in which stretching deformation occurs includes at least a first human body region in which stretching deformation occurs and a second human body region in which stretching deformation occurs; and performing algorithm constraint correction on the first human body region, the second human body region, and the (Continued)

background region to obtain a second corrected image, where constraint terms used for the algorithm constraint correction respectively constrain the first human body region, the second human body region, and the background region.

20 Claims, 21 Drawing Sheets

(51) Int. Cl.
   *G06T 3/40* (2024.01)
   *G06T 3/60* (2024.01)
   *G06T 7/194* (2017.01)
(52) U.S. Cl.
   CPC .... *G06T 7/194* (2017.01); *G06T 2207/20132* (2013.01); *G06T 2207/30196* (2013.01)
(58) Field of Classification Search
   CPC . G06T 15/20; G06T 2207/30196; G06T 3/00; G06T 2207/10004; G06T 2207/20172; G06T 2207/30208; G06T 3/06; G06T 3/12; G06T 3/18; G06T 7/136; G06T 7/12; G06T 3/40; G06T 3/60; G06T 2207/20132; G06T 7/90; G06T 2207/10016; G06T 2210/44
   See application file for complete search history.

(56) References Cited

U.S. PATENT DOCUMENTS

| | | | |
|---|---|---|---|
| 2015/0131924 A1* | 5/2015 | He | G06T 3/047 382/284 |
| 2015/0213305 A1* | 7/2015 | Sundstrom | G06F 16/58 382/118 |
| 2016/0330384 A1 | 11/2016 | Park et al. | |
| 2018/0033149 A1 | 2/2018 | Jeong et al. | |
| 2019/0251675 A1 | 8/2019 | Bai et al. | |
| 2020/0265569 A1* | 8/2020 | Lee | G06F 3/0482 |

FOREIGN PATENT DOCUMENTS

| | | |
|---|---|---|
| CN | 105046657 A | 11/2015 |
| CN | 107506693 A | 12/2017 |
| CN | 108986172 A | 12/2018 |
| CN | 109961401 A | 7/2019 |
| IN | 107665477 A | 2/2018 |
| JP | 2019125269 A | 7/2019 |

OTHER PUBLICATIONS

YiChang Shih, Wei-Sheng Lai, and Chia-Kai Liang. 2019. Distortion-free wide-angle portraits on camera phones. ACM Trans. Graph. 38, 4, Article 61 (Aug. 2019), 12 pages. (Year: 2019).*

Yichang Shih, et al, "Distortion-Free Wide-Angle Portraits on Camera Phones," ACM Trans. Graph., vol. 38, No. 4, Article 61. Publication date: Jul. 2019, 12 pages.

* cited by examiner

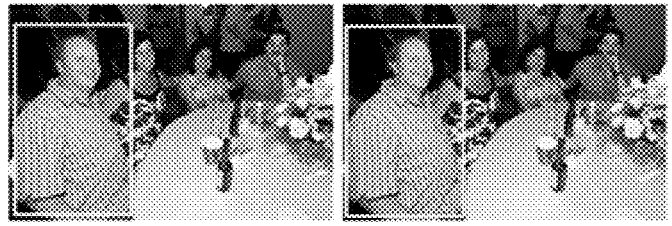 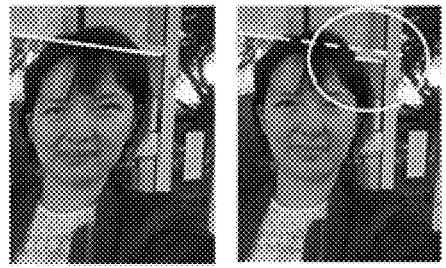
FIG. 1A The body is not corrected
FIG. 1B A background straight line is discontinuous Normal image Image in which pincushion distortion occurs Image in which barrel distortion occurs Optical module collects a rectangular image Optical distortion correction is performed, to obtain an abnormal-shaped image

IMAGE DISTORTION CORRECTION METHOD AND APPARATUS

CROSS-REFERENCE TO RELATED APPLICATIONS

This is a continuation of International Patent Application No. PCT/CN2020/114400 filed on Sep. 10, 2020, which claims priority to Chinese Patent Application No. 201910896549.6 filed on Sep. 18, 2019. The disclosures of the aforementioned applications are hereby incorporated by reference in their entireties.

TECHNICAL FIELD

This application relates to image processing technologies, and in particular, to an image distortion correction method and an apparatus.

BACKGROUND

With the development of information technology, increasing functions are integrated into a terminal (for example, a mobile phone), and a photographing function becomes one of important functions of the terminal. In recent years, as there is an increasingly large field of view of a lens of the terminal, there is an increasingly significant problem of portrait distortion in an image captured by the terminal.

Image distortion refers to a phenomenon in which deformation/distortion, in a geometric shape, such as stretching or distortion occurs in content of an image and that is caused by the fact that an optical system with a large field of view and a short focal length does not meet a pinhole model, and after chief rays of different fields of view pass through the optical system, a height of a focal point on a Gaussian image plane is not equal to an ideal image height, and consequently an actual image point deviates from an ideal image point. For example, for a mobile phone with a wide-angle lens, an image of a large field of view can be obtained, but significant image distortion can be easily introduced. For example, in a captured image, more severe deformation/distortion is presented for a portrait (namely, a portrait of a large field of view) located on an outer side of the image. Therefore, an image in which image distortion occurs needs to be corrected, such that the image fits human vision.

In an existing solution, a rectangular object region and a background region are determined using a detection algorithm in a source image (original image) collected by a camera, and a homography constraint is established for the rectangular object region, to correct stretching deformation occurring in the rectangular object region; a straight line region in the background region is determined using a straight line detection algorithm, and a straight line constraint is established for the straight line region, to ensure that a corrected straight line is not curved; and a homography compatibility constraint is further established for the rectangular object region and the background region, to ensure continuity of a straight line boundary between the two regions, so as to obtain a final corrected image through rendering.

However, in this solution, a straight line needs to be calibrated on the source image, and a final image correction effect is affected by straight line detection precision. In addition, in this solution, a portrait can be corrected only as a whole, and consequently a final portrait does not really fit human vision. As shown in FIG. 1A, a left image is an image before correction, and a right image is a corrected image, and it may be learned that the body of an object on a left side of the corrected image is not corrected. Furthermore, in this solution, discontinuity is prone to occur in the background region. As shown in FIG. 1B, a left image is an image before correction, and a right image is a corrected image, and it may be learned that discontinuity occurs in straight line content of an object background in the corrected image.

Therefore, how to implement natural image distortion correction is still a difficult technical challenge.

SUMMARY

Embodiments of this application provide an image distortion correction method and an apparatus, to resolve a disadvantage in the conventional technology, implement natural image distortion correction, and improve user experience.

According to a first aspect, an embodiment of this application provides an image distortion correction method. The method may be applied to a terminal, and the method includes: performing optical distortion correction on a collected source image, to obtain a first corrected image, where the first corrected image includes a background region and a portrait in which stretching deformation occurs, and where the portrait in which stretching deformation occurs includes at least a first human body region in which stretching deformation occurs and a second human body region in which stretching deformation occurs; and performing algorithm constraint correction on the first human body region, the second human body region, and the background region, to obtain a second corrected image, where constraint terms used for the algorithm constraint correction respectively constrain the first human body region, the second human body region, and the background region. For example, the constraint terms corresponding to the first human body region and the second human body region are determined based on different projection algorithms, such that different deformation amounts can be achieved in the first human body region and the second human body region, to correct the stretching deformation in both the first human body region and the second human body region. The constraint term of the background region is used to constrain the background region in the second corrected image, such that image content in the background region is not distorted, for human vision there is no discontinuity in image content throughout the portrait in the background region, and a smooth and natural transition is implemented between the first human body region, the second human body region, and the background region.

It may be learned that in the solution of this application, the terminal may perform, by region (including the first human body region, the second human body region, and the background region), algorithm constraint correction processing on an image (namely, the first corrected image) obtained after optical distortion correction, and separately perform shape correction based on different projection algorithms when constraining the first human body region and the second human body region of the portrait, to ensure that the portrait is best corrected. A background image is constrained, to ensure that no background distortion or discontinuity occurs in the image content in the background region due to foreground correction. Therefore, implementing the solution of this application can ensure that after the image is corrected, both the portrait and background content are natural, continuous, and harmonious, and fit a human visual habit. In this way, user experience is greatly improved.

According to the first aspect, in a possible implementation, the first corrected image further includes a field of view edge region, and the field of view edge region is a strip region located on an image edge in the first corrected image. Additionally, the performing algorithm constraint correction on the first human body region, the second human body region, and the background region, to obtain a second corrected image includes: performing algorithm constraint correction on the first human body region, the second human body region, the background region, and the field of view edge region, to obtain the second corrected image.

During implementation of this embodiment of this application, boundary constraint is performed for the field of view edge region, and therefore a problem of a field of view loss can be avoided, and a content loss caused by cropping can be reduced. In this way, user experience is improved.

According to the first aspect, in a possible implementation, the first human body region includes a head region of the portrait, and the second human body region includes a body region of the portrait.

The head region and the body region of the portrait differ in stretching deformation amount and deformation manner, and therefore the head region and the body region differ in area, and a user has different tolerance for deformation of the head region and the body region. During implementation of this embodiment of this application, algorithm constraint correction processing may be performed on the head region and the body region of the portrait, the background region, and the field of view edge region, such that optimization can be performed for deformation of both the head region and the body region, to ensure that the portrait is best corrected.

According to the first aspect, in a possible implementation, the performing algorithm constraint correction on the first human body region, the second human body region, the background region, and the field of view edge region, to obtain the second corrected image includes: determining initial image matrices respectively corresponding to the head region, the body region, the background region, and the field of view edge region in the first corrected image; constructing constraint terms respectively corresponding to the head region, the body region, the background region, and the field of view edge region; constructing a regular constraint term for the first corrected image; obtaining displacement matrices respectively corresponding to the head region, the body region, the background region, and the field of view edge region based on the constraint terms respectively corresponding to the head region, the body region, the background region, and the field of view edge region, the regular constraint term, and weight coefficients corresponding to the constraint terms; and obtaining the second corrected image through color mapping based on the initial image matrices respectively corresponding to the head region, the body region, the background region, and the field of view edge region and the displacement matrices respectively corresponding to the head region, the body region, the background region, and the field of view edge region.

For example, the terminal may set the weight coefficients for the constraint terms of the head region and the body region of the portrait, the field of view edge region, and the background region and the regular constraint term, establish a constraint equation based on the constraint terms and the corresponding weight coefficients, and solve the constraint equation, to obtain an offset of each pixel in each region. A new position of each pixel in a final corrected image (namely, the second corrected image) may be known based on an original position and the offset of each pixel, and the second corrected image may be obtained by performing color mapping at the new position. Therefore, during implementation of this embodiment of this application, the image can be automatically corrected, and an algorithm constraint correction process can be basically performed in a processor of the terminal without being perceived by the user. Therefore, the user can view a rectangular image effect with both an excellent portrait effect and an excellent background effect after completing photographing using the terminal, thereby greatly improving user experience.

According to the first aspect, in a possible implementation, the obtaining the second corrected image through color mapping based on the corresponding initial image matrices and the corresponding displacement matrices includes: obtaining target image matrices respectively corresponding to the head region, the body region, the background region, and the field of view edge region based on the initial image matrices respectively corresponding to the head region, the body region, the background region, and the field of view edge region and the displacement matrices respectively corresponding to the head region, the body region, the background region, and the field of view edge region; and obtaining the second corrected image based on the target image matrices respectively corresponding to the head region, the body region, the background region, and the field of view edge region and color matrices respectively corresponding to the head region, the body region, the background region, and the field of view edge region.

According to the first aspect, in a possible implementation, it is assumed that a coordinate matrix (which may also be referred to as a target image matrix) of the image (namely, the second corrected image) obtained after algorithm constraint correction is Mt(i,j), where Mt(i,j)=[ut(i,j), vt(i,j)]$^T$.

A displacement matrix of the second corrected image with respect to an image matrix M0(i,j) in the first corrected image is Dt(i,j), where Dt(i,j)=[du(i,j), dv(i,j)]$^T$.

In other words, Mt(i,j)=M0(i,j)+Dt(i,j).

The weight coefficients are assigned to the constraint terms, and the following constraint equation is constructed: Dt(i,j)=(du(i,j), dv(i,j))=argmin (α1(i,j)*Term1(i,j)+α2(i,j)*Term2(i,j)+α3(i,j)*Term3(i,j)+α4(i,j)*Term4(i,j)+α5(i,j)*Term5(i,j)).

Herein, Term1 to Term5 are constraint terms respectively corresponding to the head region, the body region, the field of view edge region, the background region, and a global image region, and α1(i,j) to α5(i,j) are weight coefficients (weight matrices) respectively corresponding to Term1 to Term5.

A displacement matrix Dt(i,j) of each pixel in the image may be obtained by solving the constraint equation using a least square method, a gradient descent method, or various improved algorithms.

The constraint term (Term1) corresponding to the head region is used to constrain the target image matrix corresponding to the head region to approximate an image matrix obtained after geometric transformation is performed on a first image matrix, to correct stretching deformation occurring in the head region. The first image matrix is obtained after the initial image matrix corresponding to the head region is processed using a spherical projection algorithm. The geometric transformation includes at least one of image rotation, image translation, and image scaling.

The constraint term (Term2) corresponding to the body region is used to constrain the target image matrix corresponding to the body region to approximate an image matrix obtained after geometric transformation is performed on a second image matrix, to correct stretching deformation occurring in the body region. The second image matrix is obtained after the initial image matrix corresponding to the body region is processed using a Mercator projection algorithm. The geometric transformation includes at least one of image rotation, image translation, and image scaling.

In this embodiment, the head region is corrected using the spherical projection algorithm, such that the head of the portrait in the image looks natural and harmonious in human vision. The body region is corrected using the Mercator projection algorithm, such that the body of the portrait in the image looks straight and harmonious, and is not inclined in human vision. The spherical projection algorithm is combined with the Mercator projection algorithm, such that the entire portrait fits human vision, and the portrait looks natural, harmonious, and non-obtrusive, thereby improving user experience.

It should be noted that in this application, coordinate processing may be performed for the head region and the body region of the portrait using other projection algorithms. For example, an evolved adaptive spherical projection algorithm may be used for the head region, and an adaptive Mercator algorithm may be used for the body region.

The constraint term (Term3) corresponding to the field of view edge region is used to constrain a pixel in the initial image matrix corresponding to the field of view edge region to be displaced along an edge of the first corrected image or towards an outer side of the first corrected image, to maintain or expand the field of view edge region.

The constraint term (Term4) corresponding to the background region is used to constrain a pixel in the initial image matrix corresponding to the background region to be displaced and a first vector corresponding to the pixel before displacement and a second vector corresponding to the pixel after displacement to be parallel to each other, such that the image content in the background region is smooth and continuous, and the image content throughout the portrait in the background region is continuous and consistent in human vision. The first vector represents a vector between the pixel before displacement and a neighboring pixel corresponding to the pixel before displacement, and the second vector represents a vector between the pixel after displacement and a neighboring pixel corresponding to the pixel after displacement.

The regular constraint term (Term5) is used to constrain a difference between any two of the displacement matrices respectively corresponding to the head region, the body region, the background region, and the field of view edge region in the second corrected image to be less than a preset threshold, such that global image content of the second corrected image is smooth and continuous.

It may be learned that in this embodiment of this application, when performing, by region (including the head region, the body region, the background region, and the field of view edge region), algorithm constraint correction processing on the abnormal-shaped image obtained after optical distortion correction, the terminal separately sets independent constraint terms to optimize a solution, to ensure that the portrait is best corrected. For the background region, a position relationship between a background pixel and a pixel in a control region of the background pixel before and after transformation is constrained, to ensure that no background distortion or discontinuity occurs in the image content in the background region due to foreground correction. For the field of view edge region, content adaptive boundary control is used. In this way, there is no problem of a field of view loss, and a field of view boundary can even be expanded, to minimize a content loss caused by cropping and the problem of a field of view loss. Therefore, implementing this embodiment of this application can ensure that after the image is corrected, both the portrait and the background content are natural, continuous, and harmonious, and fit a human visual habit. In this way, user experience is greatly improved, and there are great commercial application benefits.

According to the first aspect, in a possible implementation, the first corrected image is a non-rectangular image; and after the obtaining the second corrected image, the method further includes: cropping the second corrected image, to obtain a rectangular image; and outputting the rectangular image.

According to the first aspect, in a possible implementation, the performing optical distortion correction on a collected source image, to obtain a first corrected image includes: performing optical distortion correction on the collected source image, to obtain a non-rectangular image; and cropping the non-rectangular image into a rectangular image, where the first corrected image is the rectangular image.

According to the first aspect, in a possible implementation, an image area occupied by the first human body region is positively correlated with a weight coefficient corresponding to a constraint term of the first human body region; and an image area occupied by the second human body region is positively correlated with a weight coefficient corresponding to a constraint term of the second human body region.

For example, an image area occupied by the head region of the portrait in the first corrected image may be configured to be positively correlated with the weight coefficient corresponding to the head constraint term, and an image area occupied by the body region of the portrait in the first corrected image may be configured to be positively correlated with the weight coefficient corresponding to the body constraint term. That is, when the head region or the body region occupies a large image area, a weight value of the head constraint term (or called as face constraint term) or the body constraint term of the corresponding region may be increased because a portrait with a large area is more sensitive to deformation, such that the head region or the body region is more natural and harmonious after correction.

According to the first aspect, in a possible implementation, a field of view of the first human body region is positively correlated with the weight coefficient corresponding to the constraint term of the first human body region; and a field of view of the second human body region is positively correlated with the weight coefficient corresponding to the constraint term of the second human body region.

For example, a field of view of the head region in the first corrected image may be configured to be positively correlated with the weight coefficient corresponding to the head constraint term, and a field of view of the body region in the first corrected image may be configured to be positively correlated with the weight coefficient corresponding to the body constraint term. That is, when the head region or the body region is a region with a large field of view, the weight value of the head constraint term or the body constraint term of the corresponding region may be increased because a portrait with a large field of view tends to be more severely deformed, such that the head region or the body region is more natural and harmonious after correction, to avoid significant deformation.

According to the first aspect, in a possible implementation, texture significance of the background region is positively correlated with the weight coefficient corresponding to the constraint term of the background region.

For example, the texture significance of the background region in the first corrected image may be configured to be positively correlated with the weight coefficient corresponding to the background constraint term. That is, when there are weak texture details for the background region, a weight of the background constraint term of the corresponding region may be decreased because the background region is insensitive to distortion or a fault caused by correction, to better correct the foreground portrait.

According to the first aspect, in a possible implementation, a weight coefficient corresponding to the constraint term of the field of view edge region when there is portrait content in the field of view edge region is greater than a weight coefficient corresponding to the constraint term of the field of view edge region when there is no portrait content in the field of view edge region.

For example, the weight coefficient corresponding to the field of view edge constraint term when there is portrait content in the field of view edge region in the first corrected image may be configured to be greater than the weight coefficient corresponding to the field of view edge constraint term when there is no portrait content in the field of view edge region. That is, when there is a portrait on a field of view edge of the image, a weight value of the edge constraint term of the corresponding region may be increased because boundary constraint may affect a correction effect of the foreground portrait, to better correct the foreground portrait.

According to the first aspect, in a possible implementation, that the terminal performs optical distortion correction on a source image, to obtain a first corrected image includes: performing, using an optical distortion correction algorithm, optical distortion correction on the source image collected by a camera apparatus. For example, the optical distortion correction algorithm may be a Zhang Zhengyou's camera calibration algorithm. After processing is performed using the optical distortion correction algorithm, the first corrected image is obtained, and a curved line is corrected into a straight line in the first corrected image.

According to the first aspect, in a possible implementation, the terminal may divide the first corrected image into object regions such as the first human body region, the second human body region, the background region, and the field of view edge region using an image segmentation method. For example, the image segmentation method may be an image semantic segmentation method in which pixel-level image recognition is automatically performed on the first corrected image using a neural network processing unit (NPU) in the terminal, an object category to which each pixel in the first corrected image belongs is marked, and content in the first corrected image is recognized, to divide the first corrected image into object regions.

According to the first aspect, in a possible implementation, the first human body region of the portrait may be a head region and a limb region of the portrait, and the second human body region of the portrait may be a torso region of the portrait.

According to a second aspect, an embodiment of this application provides an apparatus. The apparatus includes an optical distortion correction module and an algorithm constraint correction module. The optical distortion correction module is configured to perform optical distortion correction on a collected source image, to obtain a first corrected image. The first corrected image includes a background region and a portrait in which stretching deformation occurs. The portrait in which stretching deformation occurs includes at least a first human body region in which stretching deformation occurs and a second human body region in which stretching deformation occurs. The algorithm constraint correction module is configured to perform algorithm constraint correction on the first human body region, the second human body region, and the background region, to obtain a second corrected image. Constraint terms used for the algorithm constraint correction respectively constrain the first human body region, the second human body region, and the background region.

The apparatus may implement, using the functional modules, the method described in any implementation/embodiment of the first aspect.

According to a third aspect, an embodiment of this application provides a terminal. The terminal may include one or more processors and a memory. The processor and the memory are connected or coupled using a bus. The memory stores one or more computer programs. The one or more processors are configured to execute the one or more computer programs. The one or more computer programs include instructions, and the instructions are used to perform the method described in the possible implementation/embodiment of the first aspect.

According to a fourth aspect, an embodiment of this application provides a terminal. The terminal may include one or more processors, a memory, and a display screen configured to display an image.

The processor, the memory, and the display screen may be connected using one or more communications buses. The memory stores one or more computer programs. The one or more processors are configured to execute the one or more computer programs. The one or more computer programs include instructions, and the instructions are used to perform the method described in the possible implementation/embodiment of the first aspect.

According to a fifth aspect, an embodiment of this application provides a computer-readable storage medium that stores a computer program, where the computer program includes program instructions. When the program instructions are executed by a processor, the processor is enabled to perform the method described in any one of the embodiments of the first aspect.

According to a sixth aspect, an embodiment of this application provides a computer program product. When the computer program product runs on a computer, the method described in any one of the embodiments of the first aspect is implemented.

It may be learned that in the embodiments of this application, the terminal may perform, by region (including the head region, the body region, the background region, and the field of view edge region), algorithm constraint correction processing on the image obtained after optical distortion correction, and separately perform shape correction on the head region and the body region of the portrait based on different projection algorithms, to ensure that the portrait is best corrected. In the embodiments of this application, it can be further ensured that no background distortion or discontinuity occurs in the image content in the background region due to foreground correction, and a content loss caused by cropping and the problem of a field of view loss can be reduced. Therefore, implementing the embodiments of this application can ensure that after the image is corrected, both the portrait and the background content are natural, continuous, and harmonious, and fit a human visual habit. In this way, user experience is greatly improved.

BRIEF DESCRIPTION OF DRAWINGS

FIG. 1A and FIG. 1B are a diagram of comparison between two types of image correction in an existing solution;

DESCRIPTION OF EMBODIMENTS

Various implementations of this application are described in detail below based on the accompanying drawings. It should be understood that this specification is not intended to limit this application to those example implementations. Rather, this application is intended to cover these implementations, and various alternatives, modifications, equivalents, and other implementations that may be included within the spirit and scope of this application as defined by the appended claims.

In the descriptions of the embodiments of this application, unless otherwise specified, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of the embodiments of this application, "a plurality of" means two or more.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

A method in the embodiments of this application may be applied to a terminal device (terminal). The terminal may be a mobile phone, a tablet computer, a notebook computer, a palmtop computer, a mobile internet device (MID), a wearable device (for example, a smart band or a smart watch), an augmented reality (AR) device, a virtual reality (VR device), a camera device (for example, a video recorder, a smart camera, a digital camera, or a camera), a vehicle-mounted device, or another device with a photographing function.

Figure 2:
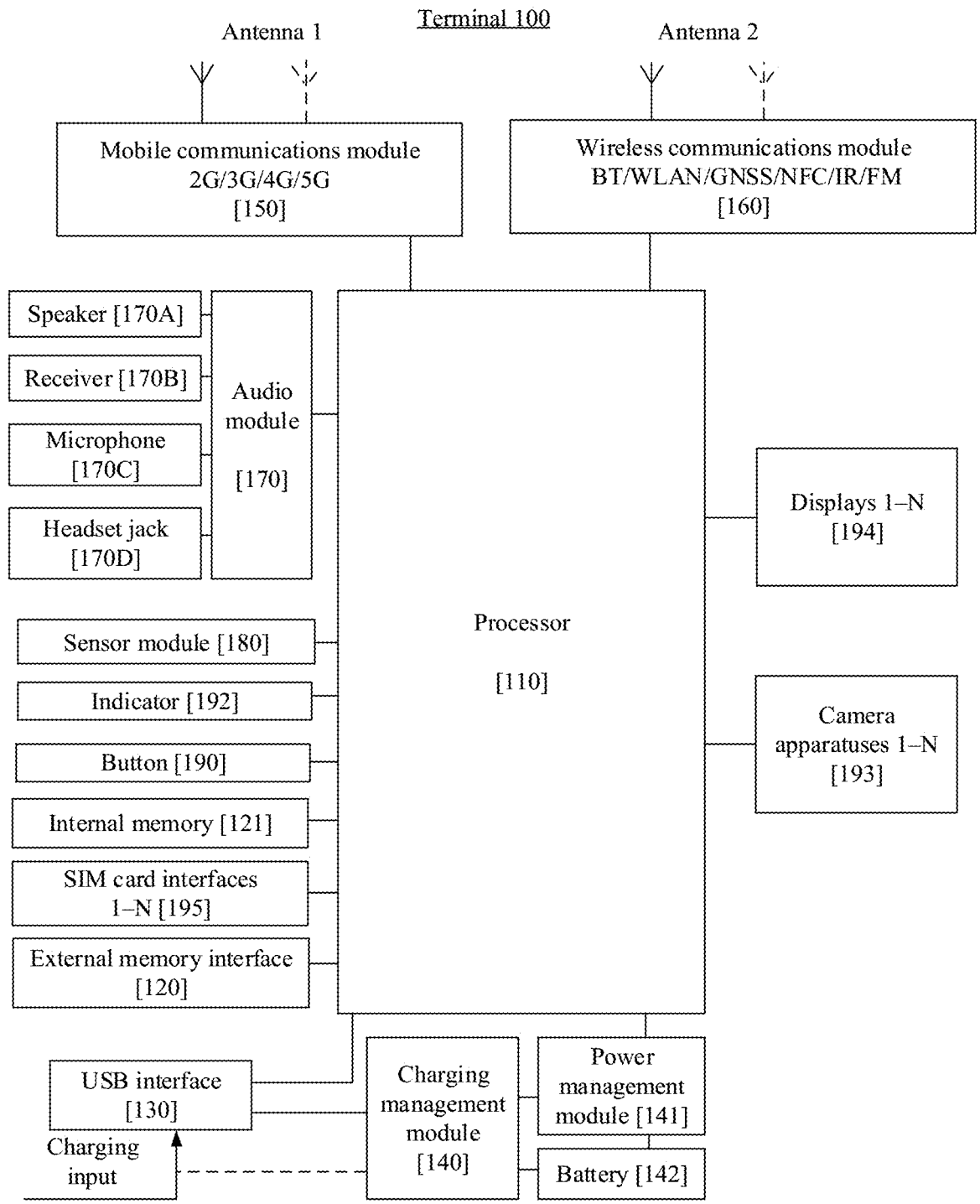
FIG. 2 is a schematic diagram of a structure of a terminal according to an embodiment of this application.

FIG. 2 is an example schematic diagram of a structure of a terminal 100. As shown in FIG. 2, the terminal 100 may include a processor 110, an external memory interface 120, an internal memory 121, a Universal Serial Bus (USB) interface 130, a charging management module 140, a power management module 141, a battery 142, a camera apparatus 193, and a display 194. Optionally, the terminal 100 may further include one or more of an antenna 1, an antenna 2, a mobile communications module 150, a wireless communications module 160, an audio module 170, a speaker 170A, a receiver 170B, a microphone 170C, a headset jack 170D, a sensor module 180, a button 190, an indicator 192, a subscriber identity module (SIM) card interface 195, and the like. The sensor module 180 may include, for example, one or more of a pressure sensor, a gyro sensor, an acceleration sensor, a distance sensor, and a fingerprint sensor.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (neural-NPU), and/or the like. Different processing units may be independent components, or may be integrated into one or more processors.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory, to avoid repeated access and reduce waiting time of the processor 110, thereby improving system efficiency.

In some embodiments, the processor 110 may include one or more interfaces. The interface may include an integrated circuit (IC) or inter-IC (I2C) interface, an inter-IC sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB interface, and/or the like.

It can be understood that an interface connection relationship, between the modules, shown in this embodiment of this application is merely an example, and does not constitute a limitation on a structure of the terminal 100. In some other embodiments of this application, the terminal 100 may alternatively use an interface connection manner different from that in this embodiment, or a combination of a plurality of interface connection manners.

The processor 110 may read an instruction, control execution of the instruction, and invoke data based on instruction operation code and a sequence signal. For example, the processor 110 may be configured to perform an image distortion correction method described in the embodiments of this application.

The charging management module 140 is configured to receive a charging input from the charger. The charger may be a wireless charger or a wired charger.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera apparatus 193, the wireless communications module 160, and the like.

A wireless communication function of the terminal 100 may be implemented using the antenna 1, the antenna 2, the mobile communications module 150, the wireless communications module 160, the modem processor, the baseband processor, and the like.

The terminal 100 may implement, using the GPU, the display 194, the application processor, and the like, a function of displaying an image/video. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flex light-emitting diode (FLED), a mini light-emitting diode (LED), a micro LED, a micro-OLED, quantum dot light-emitting diodes (QLEDs), or the like. In some embodiments, the terminal 100 may include one or N displays 194, where N is a positive integer greater than 1.

In some implementations, the display 194 may be a touchscreen. The touchscreen may include a display panel and a touch-sensitive surface that covers the display panel. When detecting a touch operation (for example, an operation such as touching, tapping, pressing, or sliding performed by a user on or near the touch-sensitive surface using any suitable object or accessory such as a finger or a stylus) on or near the touch-sensitive surface, the touch-sensitive surface transfers the touch operation to the processor 110 to determine a type of a touch event, and then the processor 110 provides corresponding visual output on the display panel based on the type of the touch event. In an example, the touch-sensitive surface and the display panel are used as two independent components to implement input and input functions. In still another example, the touch-sensitive surface and the display panel are integrated to implement input and output functions.

Optionally, the touch-sensitive surface may include two parts: a touch detection apparatus and a touch controller. The touch detection apparatus detects a touch position of the user, detects a signal brought by a touch operation, and transfers the signal to the touch controller. The touch controller receives touch information from the touch detection apparatus, converts the touch information into touch point coordinates, and sends the touch point coordinates to the processor 110, and can receive and execute a command sent by the processor 110. In addition, the touch-sensitive surface may be implemented in a plurality of types such as a resistive type, a capacitive type, an infrared type, and a surface acoustic wave type.

Optionally, the display panel may be configured to display information entered by the user or information provided for the user and various display interfaces of the terminal 100. The display interface may be a user interface (UI) or a graphical user interface (GUI). Interface content may include an interface of an application that is running, a system-level menu, and the like, and may include an image (picture), text, an icon, a video, a Button, a slider or scroll bar, a menu, a window, a label, an input box, and any combination thereof.

The terminal 100 may implement a photographing function through the ISP, the camera apparatus 193, the video codec, the GPU, the display 194, the application processor, and the like.

The ISP is configured to process data fed back by the camera apparatus 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scene. In some embodiments, the ISP may be disposed in the camera apparatus 193.

The camera apparatus 193 is configured to capture a static image or a video. An optical image is generated after an object passes through the lens (for example, an optical lens module), and is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. Then, the image signal may be displayed on the display 194, and/or the image signal may be stored in the internal memory 121 or the external memory.

In some embodiments, the camera apparatus 193 may include a camera, for example, an infrared camera or another camera, for collecting an image required for facial recognition. The camera for collecting an image required for facial recognition is usually located on a front side of an electronic device, for example, above a touchscreen, or may be located at another position. This is not limited in this embodiment of this application.

In some embodiments, the camera of the camera apparatus 193 includes but is not limited to an optical camera, an infrared camera, and a depth camera. An example form may be a single-lens camera or a multi-lens camera. A lens of the camera may be a standard lens, a wide-angle lens, an ultra-wide-angle lens, a fisheye lens, a long-focus lens, or a combination thereof.

In some embodiments, the camera of the camera apparatus 193 may include a front-facing camera and/or a rear-facing camera.

In this specification, an image signal output by the camera apparatus 193 may be referred to as a "source image". The source image may be output to the processor for further image distortion correction processing.

The video codec is configured to compress or decompress a digital video. The terminal 100 may support one or more video codecs. Therefore, the terminal 100 may play or record videos in a plurality of coding formats, for example, Moving Picture Experts Group (MPEG)1, MPEG2, MPEG3, and MPEG4.

The DSP is configured to process a digital signal. In addition to the digital image signal, the DSP may further process another digital signal. For example, when the terminal 100 selects a frequency, the digital signal processor is configured to perform Fourier transform and the like on frequency energy.

The NPU is configured to quickly process input information using a biological neural network structure such as a mode of transmission between human neurons, and may further constantly perform self-learning. The NPU can implement applications such as intelligent cognition of the terminal 100, such as image recognition, facial recognition, speech recognition, and text understanding.

The internal memory 121 may be configured to store computer-executable program code. The executable program code includes instructions. The processor 110 runs the instructions stored in the internal memory 121, to implement various function applications and data processing of the terminal 100. The internal memory 121 may include a program storage area and a data storage area. The program storage area may store an operating system, an application (for example, an app for camera shooting or an app for image beautifying) required by at least one function, and the like. The data storage area may store data (for example, corrected image data) and the like created when the terminal 100 is used. In addition, the internal memory 121 may include a high-speed random access memory, and may further include a nonvolatile memory, for example, at least one magnetic disk storage device, a flash memory, and a universal flash storage (UFS).

The external memory interface 120 may be configured to connect to an external memory card, for example, a micro secure digital (SD) card, to expand a storage capability of the terminal 100. The external storage card communicates with the processor 110 through the external memory interface 120, to implement a data storage function. For example, files such as music and a video are stored in the external memory card.

The terminal 100 may implement audio functions such as music playing, video background music playing, and recording through the audio module 170, the speaker 170A, the receiver 170B, the microphone 170C, the headset jack 170D, the application processor. The audio module 170 is configured to convert digital audio information into analog audio signal output, and is also configured to convert analog audio input into a digital audio signal. The speaker 170A, also referred to as a "loudspeaker", is configured to convert an audio electrical signal into a sound signal. The receiver 170B, also referred to as an "earpiece", is configured to convert an audio electrical signal into a sound signal. The microphone 170C, also referred to as a "mike" or a "mic", is configured to convert a sound signal into an electrical signal. The headset jack 170D is configured to connect to a wired headset. The headset jack 170D may be a USB port 130, or may be a 3.5 mm open mobile terminal platform (OMTP) standard interface or CTIA standard interface.

The button 190 includes a power button, a volume button, and the like. The button 190 may be a mechanical button, or may be a touch button. The terminal 100 may receive a key input, and generate a key signal input related to user setting and function control of the terminal 100.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal 100. In some embodiments, the terminal 100 uses an embedded SIM (eSIM) card. The eSIM card may be embedded into the terminal 100, and cannot be separated from the terminal 100.

It can be understood that the structure shown in this embodiment of this application does not constitute a specific limitation on the terminal 100. In some other embodiments of this application, the terminal 100 may include more or fewer components than those shown in the figure, or combine some components, or split some components, or have different component arrangements. Components shown in figure may be implemented in hardware, software, or a combination of hardware and software that includes one or more signal processing and/or application-specific integrated circuits.

A software system of the terminal 100 may use a layered architecture, an event-driven architecture, a microkernel architecture, a micro service architecture, or a cloud architecture. A software structure of the terminal 100 is described below using an Android system with a layered architecture as an example.

Figure 3:
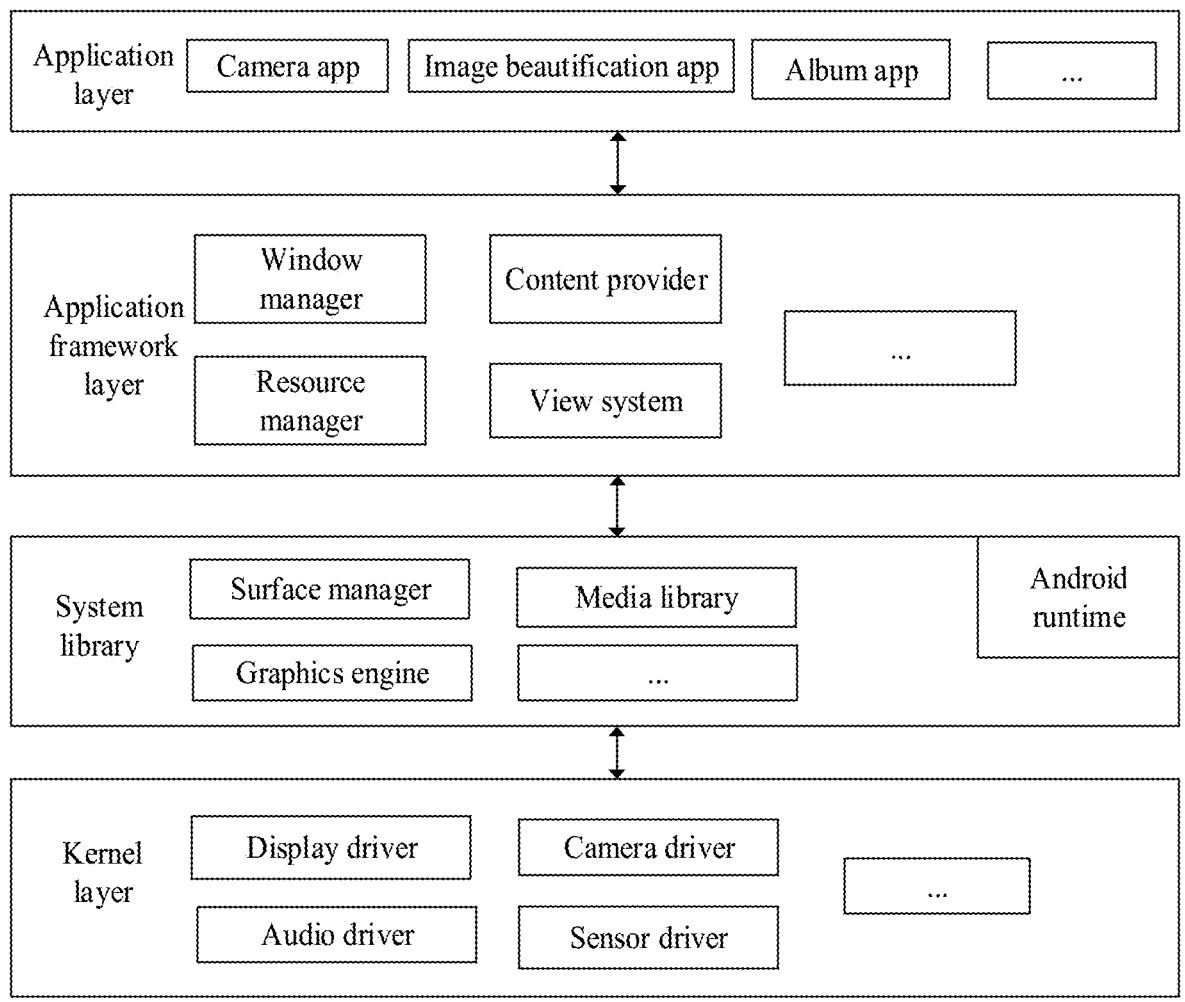
FIG. 3 is a block diagram of a software structure of a terminal according to an embodiment of this application.

FIG. 3 is a block diagram of a possible software structure of a terminal 100 according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime and system library, and a kernel layer from top to bottom.

The application layer may include a series of application packages. As shown in FIG. 3, the application package may include applications such as a camera app, an image beautification app, and an album app.

The application framework layer provides an application programming interface (API) and a programming framework for an application at the application layer. The application framework layer includes some predefined functions. As shown in FIG. 3, the application framework layer may include a window manager, a content provider, a resource manager, a view system, and the like.

The window manager is configured to manage a window program. The window manager may obtain a size of a display, determine whether there is a status bar, perform screen locking, and the like.

The content provider is configured to: store and obtain data, and enable the data to be accessed by an application. The data may include image data, video data, and the like.

The resource manager provides various resources for an application, such as a localized portrait string, an icon, a picture, a layout file, and a video file.

The view system includes visual controls, such as a control for displaying a text and a control for displaying an image. The view system may be configured to construct a display interface of an application.

Figure 4A:
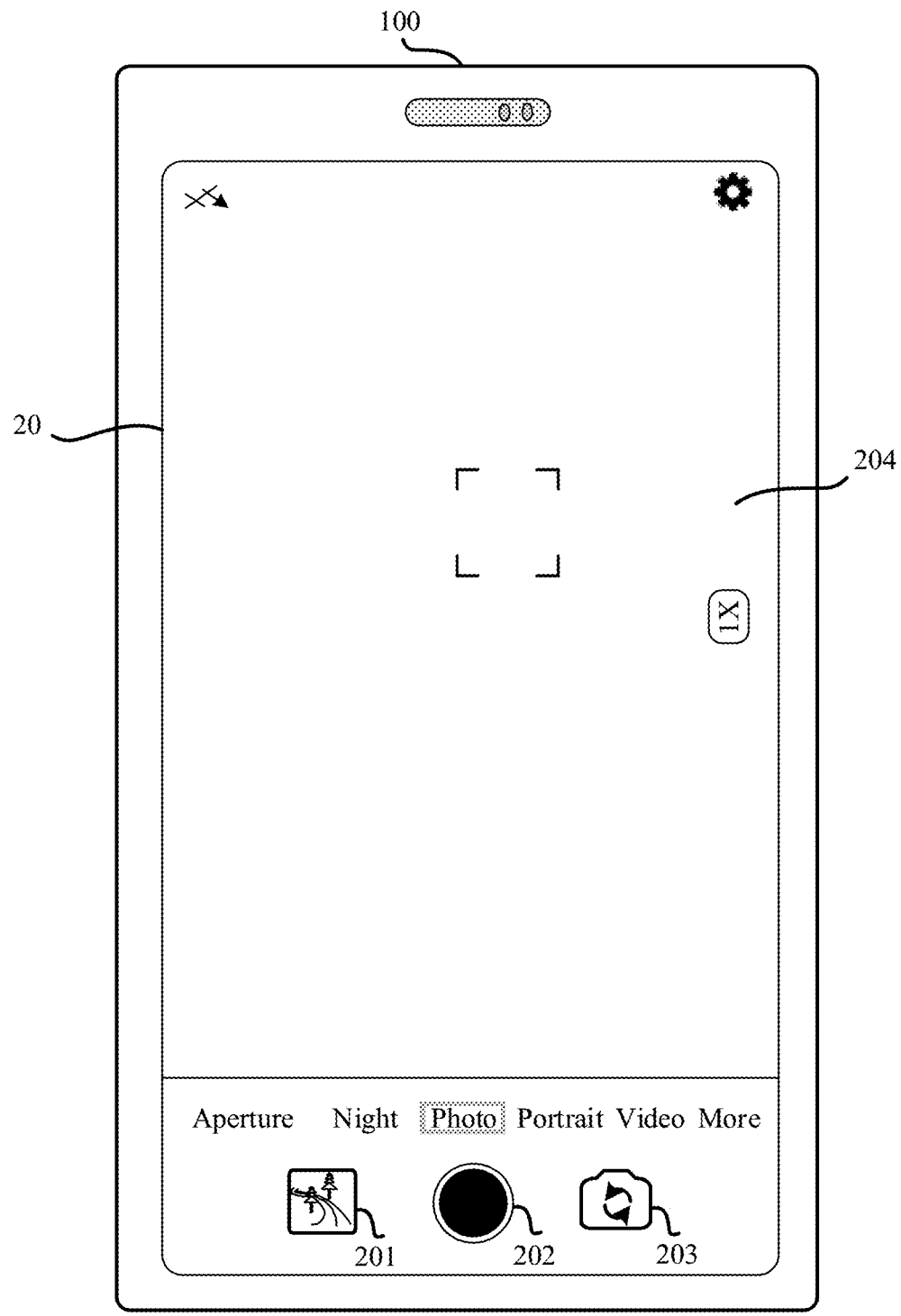
FIG. 4A and FIG. 4B are a schematic diagram of a photographing interface and an album interface of a terminal according to an embodiment of this application.

For example, a display interface of a photographing app presented using the view system is shown in FIG. 4A. A photographing interface 20 may be displayed on a display panel of the terminal 100. The photographing interface 20 may include a preview box 204 and some related controls such as an image browsing control 201, a photographing control 202, and a switching control 203 for performing switching between a front-facing camera and a rear-facing camera. The preview box 204 is used to preview a scene image to be captured.

In an embodiment of this application, an image presented in the preview box 204 may be a corrected image (which may also be referred to as a first corrected image) obtained after optical distortion correction processing is performed.

In still another embodiment of this application, an image presented in the preview box 204 may be a corrected image (which may also be referred to as a second corrected image) obtained after optical distortion correction processing and algorithm constraint processing are performed.

In still another embodiment of this application, an image presented in the preview box 204 may be a source image that does not undergo optical distortion correction processing or algorithm constraint processing.

When tapping or touching the switching control 203 for performing switching between the front-facing camera and the rear-facing camera, the user may indicate the terminal 100 to select the front-facing camera or the rear-facing camera for photographing.

When the user taps or touches the photographing control 202, the terminal 100 drives a camera apparatus to initiate a photographing operation, indicates the lower-layer system library to process a source image into a second corrected image, and stores the second corrected image in an album.

Figure 4B:
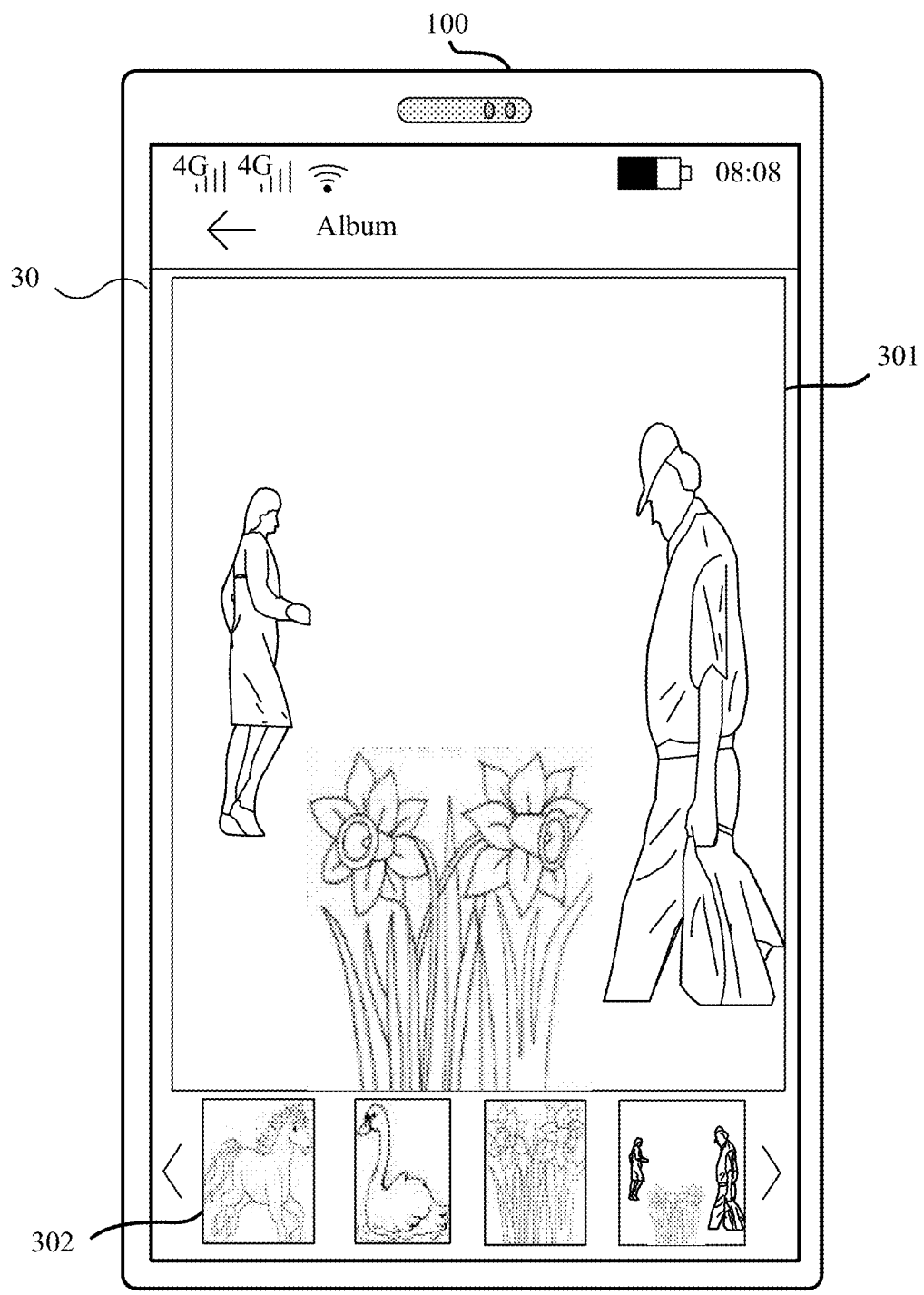

When the user taps or touches the image browsing control 201, the terminal 100 may invoke the album app, and display the second corrected image. As shown in FIG. 4B, a display interface 30 of the album app may include the obtained second corrected image 301, and optionally, may further include thumbnails 302 of one or more recently captured images.

Scheduling and management of the Android system during Android runtime may include a kernel library and a virtual machine. The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, and a graphics engine (for example, SGL).

The surface manager is configured to: manage a display subsystem, and provide a layer fusion function for a plurality of applications.

The media library supports playback and recording of audio and video in a plurality of commonly used formats, static image files, and the like. The media library may support a plurality of audio and video coding formats, such as MPEG-4, H.264, MP3, AAC, AMR, JPG, and PNG.

The graphics engine is a drawing engine for performing image processing. In this embodiment of this application, the graphics engine may be configured to: process a source image into a first corrected image, and process the first corrected image into a second corrected image.

The kernel layer is a layer between hardware and software. The kernel layer includes at least a display driver, a camera driver, an audio driver, and a sensor driver. The camera driver may be configured to drive the camera of the terminal 100 to perform photographing. The display driver may be configured to display an image (the first corrected image or the second corrected image) on a display panel of a display screen.

The following describes some concepts in the embodiments of this application.

In the embodiments of this application, a "source image" represents an original image collected by a camera apparatus of a terminal. The camera apparatus includes an optical lens module and a photosensitive element. For example, the photosensitive element includes a charge coupled device (CCD). During photographing, light of a to-be-photographed object is focused using the optical lens module and projected to the CCD. The CCD is made of a highly photosensitive semiconductor material, and usually includes many photosensitive units that are usually in megapixels. When a surface of the CCD is illuminated by light, each photosensitive unit reflects a charge on a component, to convert the light into an electrical signal. Signals generated by all the photosensitive units together form a complete electrical signal. The CCD then transfers the electrical signal to an ISP for conversion into a digital image signal. The ISP outputs the digital image signal to the DSP for processing. The DSP converts the digital image signal into an image signal in a standard format such as RGB or YUV.

An imaging process of the camera apparatus essentially reflects a conversion process of a coordinate system. That is, the imaging process is actually a process of converting a point of the to-be-photographed object into a world coordinate system to a camera coordinate system of the camera apparatus, then projecting the point to a physical image coordinate system of an imaging plane, and finally converting data on the imaging plane into an image pixel coordinate system of an image plane.

Due to an inherent characteristic (light is converged by a convex lens and light is diffused by a concave lens) of a lens in the optical lens module, lens precision, and a processing technology, optical distortion is usually introduced into a source image obtained using the optical lens module, resulting in image distortion. Distortion refers to a degree of distortion of an image, obtained using an optical system, of an object with respect to the object. Optical distortion refers to a degree of deformation calculated based on an optical theory. A spatial straight line is curved in an image in which optical distortion occurs. Distortion caused by optical distortion is very unfavorable to imaging quality of a photo. Due to existence of optical distortion, a curved line may be presented after a straight line of the to-be-photographed object in the world coordinate system is finally converted into the image pixel coordinate system. Particularly, in an image, optical distortion causes more significant distortion to the image at a position closer to an edge of the image. In addition, there is more significant optical distortion for a wide-angle camera than for an ordinary camera.

When the terminal is a mobile terminal such as a mobile phone, a tablet computer, or a wearable device, the optical lens module usually suffers from severe optical distortion due to an optical design of the lens. This is related to a field of view of the mobile terminal. A larger field of view usually indicates more severe optical distortion suffered by the optical lens module.

Optical distortion may also be referred to as image distortion, lenticular lens distortion, shooting distortion, camera distortion, lens distortion, and the like. Types of optical distortion mainly include radial distortion and tangential distortion.

Tangential distortion usually occurs due to the fact that the lens is not parallel to the image plane because there is a manufacturing disadvantage for the camera apparatus.

Figure 5:
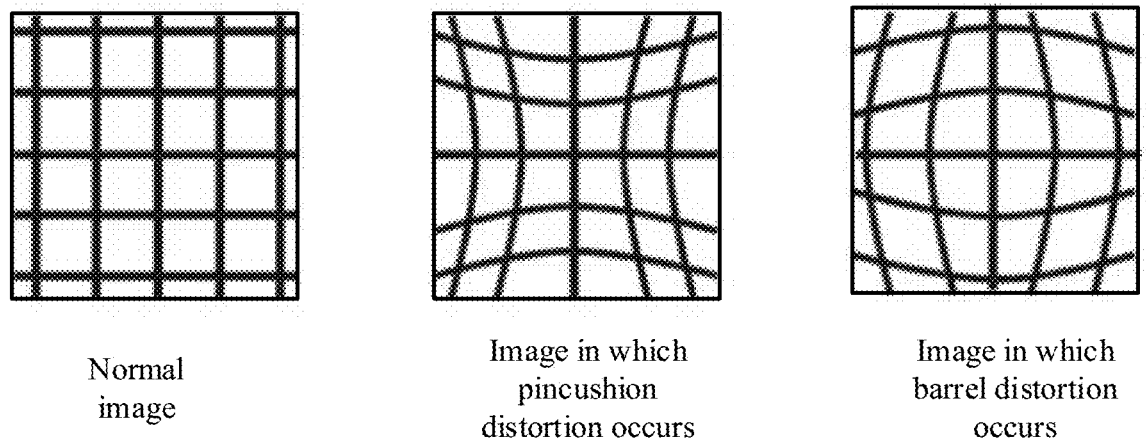
FIG. 5 is a schematic diagram of comparison between an image in which barrel distortion occurs, an image in which pincushion distortion occurs, and a normal image according to an embodiment of this application.

Radial distortion occurs due to the fact that light is curved to a larger extent at a position far away from a center of the lens than at a position close to the center. For example, radial distortion mainly includes two types: barrel distortion and pincushion distortion. FIG. 5 is a schematic diagram of comparison between an image in which barrel distortion occurs, an image in which pincushion distortion occurs, and an ideal normal image.

Barrel aberration may also be referred to as barrel distortion, and is a distortion phenomenon that is caused due to physical properties of the lens and a structure of a lens group and in which an imaging picture presents barrel-shaped expansion. Usually, it is most likely to detect the barrel distortion phenomenon when a wide-angle lens or a wide-angle end with a zoom lens is used. It is most likely to detect barrel distortion when there is a line (especially a line close to an edge of an image) in a picture.

Pincushion aberration may also be referred to as pincushion distortion, and is a distortion phenomenon that is caused due to the lens and in which a picture "converges" towards a center. Usually, it is most likely to detect the pincushion distortion phenomenon when a long-focus lens or a long-focus end with a zoom lens is used. Pincushion distortion is prone to occur especially when a focal length converter is used. It is most likely to detect pincushion distortion when there is a line (especially a line close to an edge of an image) in a picture.

Therefore, in the embodiments of this application, the "source image" collected by the camera apparatus may also be referred to as a "distorted image".

To reduce distortion in an image, in the embodiments of this application, optical distortion correction may be first performed on the source image. During optical distortion correction, a mapping relationship between point positions before and after image distortion is calculated using an optical distortion correction algorithm, to determine a distortion coefficient of the image, and then transformation opposite to distortion is performed, and a pixel value of a position after distortion is assigned to an original position, to alleviate distortion caused by aberration.

Figure 6:
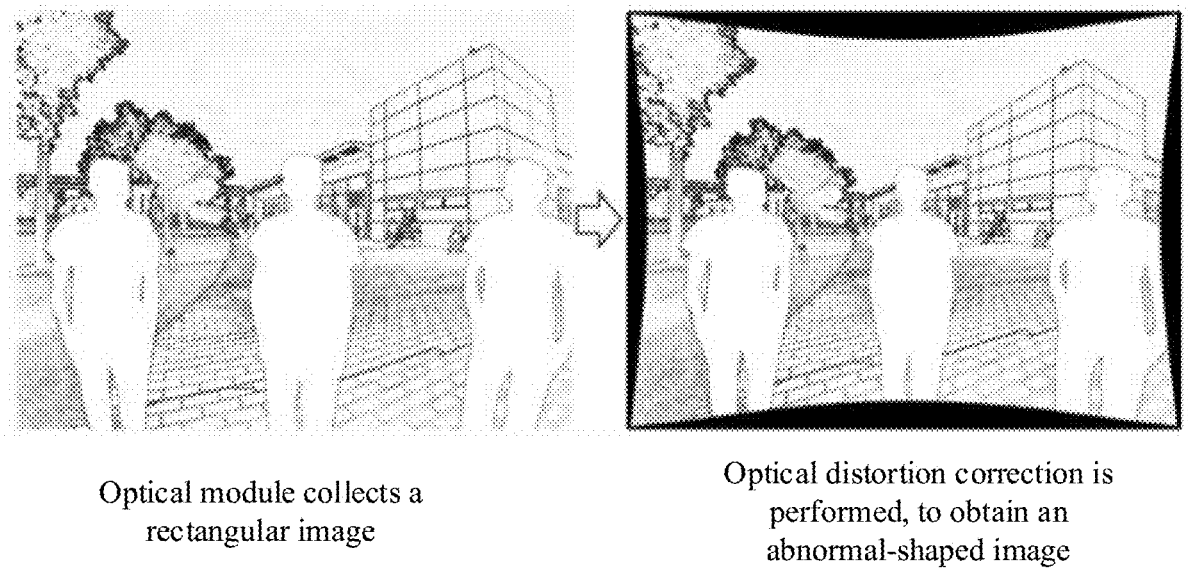
FIG. 6 is a comparison diagram of optical distortion correction processing according to an embodiment of this application.

As shown in FIG. 6, a left image in FIG. 6 is a rectangular image collected by the optical lens module. After optical distortion correction processing is performed on the rectangular image, a pixel is displaced, and therefore an image obtained after optical distortion correction is a non-rectangular image, as shown in a right image in FIG. 6. In the embodiments of this application, the non-rectangular image obtained after optical distortion correction may also be referred to as an "abnormal-shaped image". To display the abnormal-shaped image on a rectangular display interface (for example, a rectangular preview box) of a display panel of the terminal, the abnormal-shaped image may be further cropped into a rectangular image, and then an operation such as image resolution conversion may be performed, to display the abnormal-shaped image on the display panel.

In the abnormal-shaped image, background content that is curved due to distortion is usually well corrected, and becomes normal straight line content. However, for a portrait in the image, there is little inherent straight line content, and therefore there is still a deformation/distortion condition such as stretching or distortion, including head deformation, body deformation, and the like in the portrait.

To better correct the deformed portrait, ensure that there is no significant deformation (for example, a background straight line cannot be curved or include a fault) in another region while the portrait is corrected, and ensure that for a corrected image, no excessively large field of view loss is caused due to cropping into a rectangular shape, in the embodiments of this application, algorithm constraint correction continues to be performed on the image (which may be referred to as a first corrected image) obtained after optical distortion correction, and a head and a body part of the portrait, an image background, an image edge, and the like are corrected based on different algorithms, to obtain a second corrected image. Both the head and the body of the portrait in the second corrected image can fit human vision, and image content throughout the portrait in the image background in the second corrected image is continuous and consistent in human vision, to avoid curved content or a fault condition in the image background. In addition, a field of view loss is well avoided for the second corrected image. Content of algorithm constraint correction is described in detail below.

Based on the foregoing description, the following provides some image distortion correction methods provided in the embodiments of this application.

For convenience, the method embodiments described below are expressed as a combination of a series of action steps. However, a person skilled in the art should understand that implementations of the technical solutions of this application are not limited to a sequence of the described series of action steps.

Figure 7:
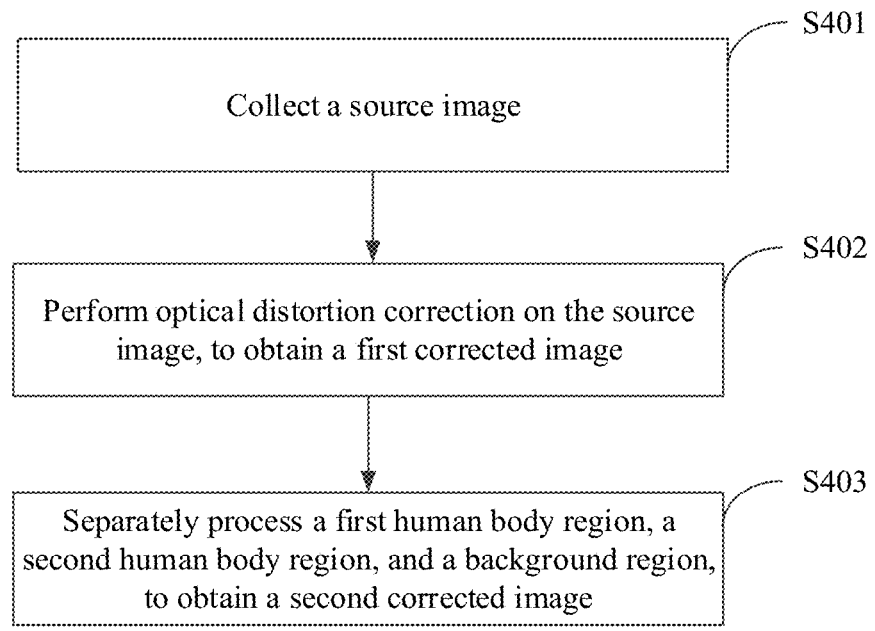
FIG. 7 is a schematic flowchart of an image distortion correction method according to an embodiment of this application.

FIG. 7 is a schematic flowchart of an image distortion correction method according to an embodiment of this application. In some implementations, the method may be applied to the terminal shown in FIG. 2, or FIG. 3. The method includes but is not limited to the following steps:

S401. The terminal collects a source image.

For example, the terminal may collect the source image using a camera apparatus (including an optical lens module and a photosensitive element). The source image may be a rectangular image. The optical lens module usually suffers from optical distortion (for example, barrel distortion) to some extent, and therefore image content of the collected source image is deformed or distorted.

S402. The terminal performs optical distortion correction on the source image, to obtain a first corrected image.

For example, the terminal may perform, using an optical distortion correction algorithm, optical distortion correction on the source image collected by the camera apparatus. For example, the optical distortion correction algorithm may be a Zhang Zhengyou's camera calibration algorithm. After processing is performed using the optical distortion correction algorithm, an abnormal-shaped image (namely, a non-rectangular image) is obtained. In an embodiment, the abnormal-shaped image is the first corrected image. In still another embodiment, the abnormal-shaped image may be cropped into a rectangular image, and the rectangular image may be processed into an image of target resolution through scaling. The image of the target resolution is the first corrected image.

S403. The terminal separately processes a first human body region, a second human body region, and a background region, to obtain a second corrected image.

In this embodiment of this application, to better correct a portrait and ensure that no significant distortion occurs in a background in a process of correcting the foreground portrait, the image needs to be first divided into regions.

For example, the terminal may divide the first corrected image into several specific object regions of interest using an image segmentation method. For example, the image segmentation method may be an image semantic segmentation method in which pixel-level image recognition is automatically performed on the first corrected image using a neural network processing unit (NPU) in the terminal, an object category to which each pixel in the first corrected image belongs is marked, and content in the first corrected image is recognized, to divide the first corrected image into object regions.

Figure 8:
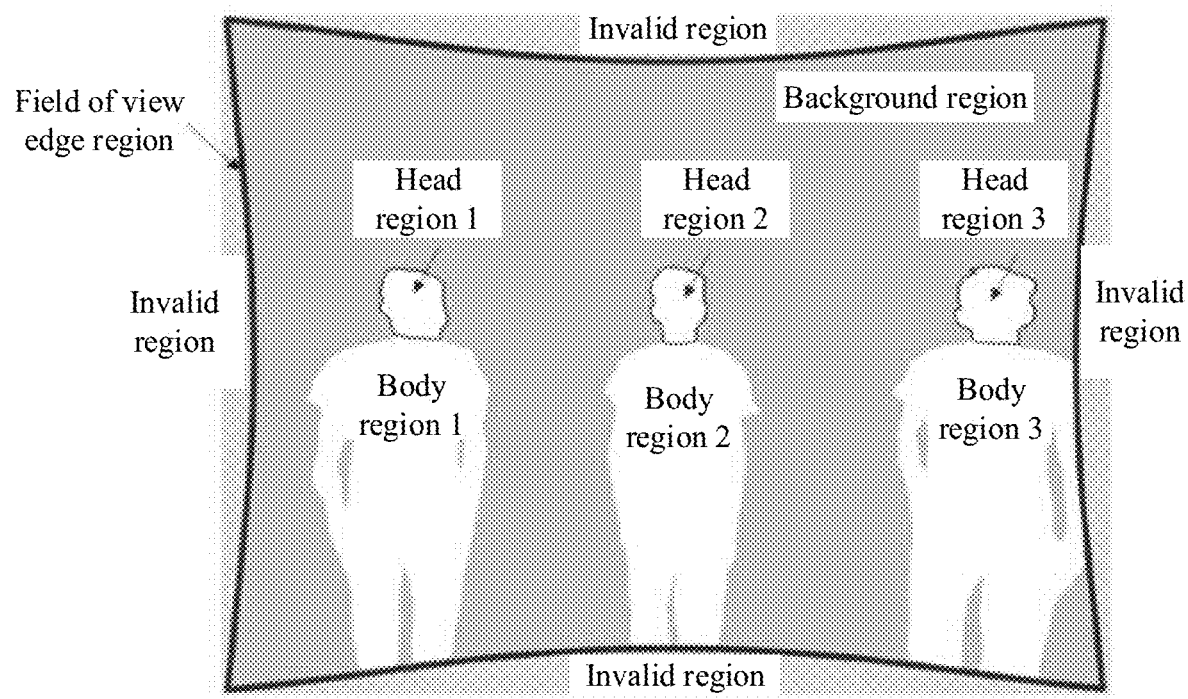
FIG. 8 is an example schematic diagram of dividing an image into regions according to an embodiment of this application.

In an implementation, regions obtained by dividing the first corrected image include the first human body region and the second human body region of the portrait and the background region. Each of the first human body region of the portrait and the second human body region of the portrait refers to a part of the portrait. For example, as shown in FIG. 8, the first human body region of the portrait may be a head region of the portrait, and the second human body region of the portrait may be a body region of the portrait. For another example, the first human body region of the portrait may be a head region and a limb region of the portrait, and the second human body region of the portrait may be a torso region of the portrait. Correspondingly, the background region is a valid region other than the first human body region and the second human body region of the portrait in the first corrected image.

Correspondingly, the terminal may separately perform algorithm constraint correction processing on the first human body region, the second human body region, and the background region, to obtain the second corrected image. In algorithm constraint correction, the first human body region and the second human body region of the portrait in the second corrected image may be based on different algorithms (for example, the head region of the portrait is processed using a spherical projection algorithm, and the body region is processed using a Mercator algorithm) to present different deformation amounts, such that stretching deformation in both the first human body region and the second human body region is corrected to fit human vision, and image content throughout the portrait in the background region in the first corrected image is continuous and consistent in human vision and includes no discontinuity.

In still another implementation, in addition to the first human body region and the second human body region of the portrait, and the background region, regions obtained by dividing the first corrected image further includes a field of view edge region. The field of view edge region is a strip region that is located at an edge of the image and that is in the first corrected image. In implementation, a threshold may be set to determine a width of the strip region. Correspondingly, the background region is a valid region other than the first human body region and the second human body region of the portrait, and the field of view edge region in the first corrected image.

Correspondingly, the terminal may separately perform algorithm constraint correction processing on the first human body region, the second human body region, the background region, and the field of view edge region, to obtain the second corrected image. During algorithm constraint correction, the first human body region and the second human body region of the portrait in the second corrected image may be based on different algorithms (for example, the head region of the portrait is processed using a spherical projection algorithm, and the body region is processed using a Mercator algorithm) to present different deformation amounts, such that stretching deformation in both the first human body region and the second human body region is corrected to fit human vision, and image content throughout the portrait in the background region in the first corrected image is continuous and consistent in human vision and includes no discontinuity. In addition, boundary constraint is performed for the field of view edge region, and therefore there is no problem of a field of view loss, and image content on a field of view boundary can even be expanded.

It may be learned that in this embodiment of this application, the terminal may perform, by region (including the head region, the body region, the background region, and the field of view edge region), algorithm constraint correction processing on the abnormal-shaped image obtained after optical distortion correction, and separately perform shape correction on the head region and the body region of the portrait based on different projection algorithms, to ensure that the portrait is best corrected. In this embodiment of this application, it can be further ensured that no background distortion or discontinuity occurs in image content in the background region due to foreground correction, and a content loss caused by cropping and the problem of a field of view loss can be reduced. Therefore, implementing this embodiment of this application can ensure that after the image is corrected, both the portrait and background content are natural, continuous, and harmonious, and fit a human visual habit. In this way, user experience is greatly improved.

Figure 9:
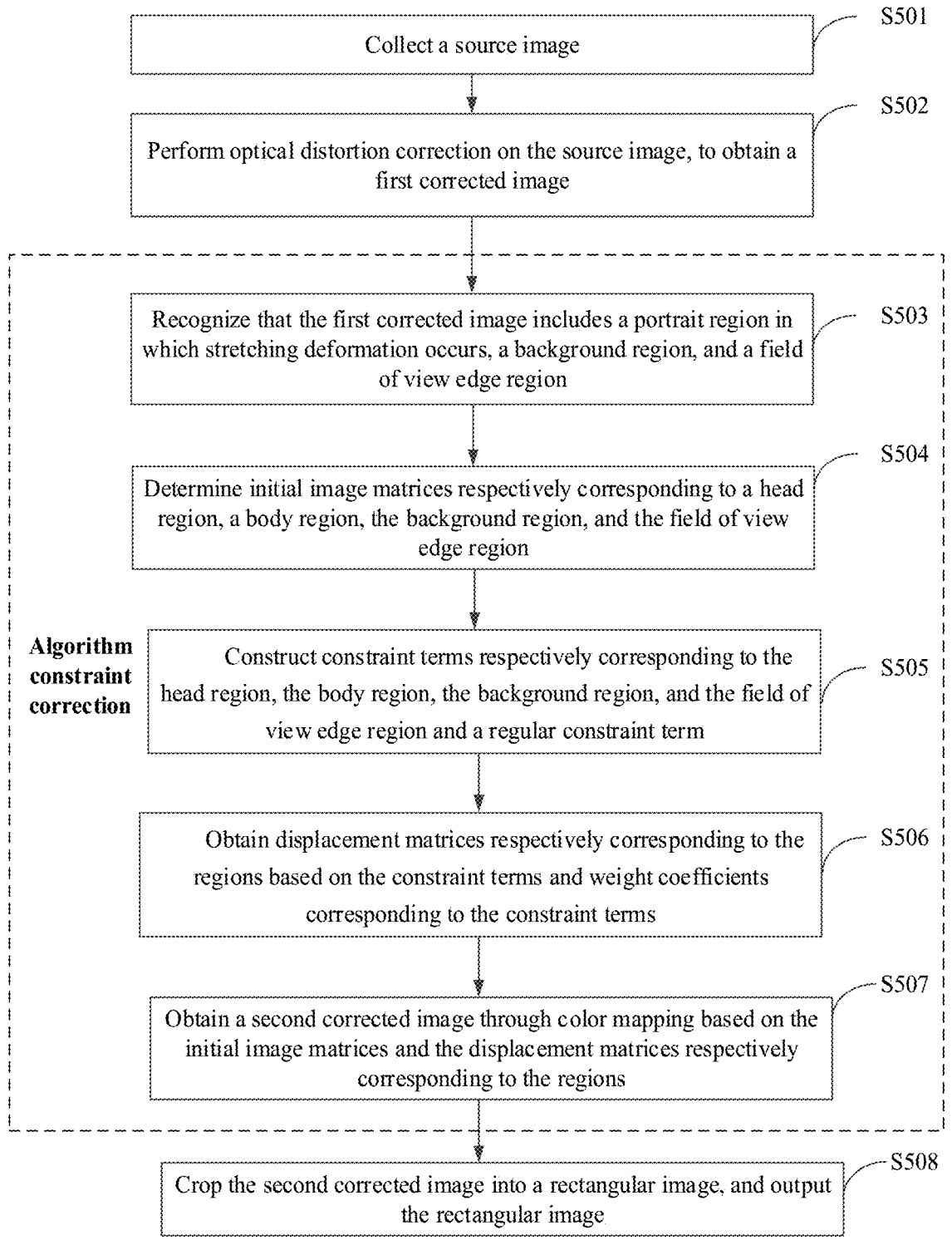
FIG. 9 is a schematic flowchart of another image distortion correction method according to an embodiment of this application.

FIG. 9 is a schematic flowchart of still another image distortion correction method according to an embodiment of this application. In some implementations, the method may be applied to the terminal shown in FIG. 2, or FIG. 3. The method includes but is not limited to the following steps:

S501. The terminal collects a source image. For details, refer to the description of S401 in the embodiment in FIG. 7. Details are not described herein.

S502. The terminal performs optical distortion correction on the source image, to obtain a first corrected image.

For example, the terminal may perform, using an optical distortion correction algorithm, optical distortion correction on the source image collected by a camera apparatus. For example, the optical distortion correction algorithm may be a Zhang Zhengyou's camera calibration algorithm. After processing is performed using the optical distortion correction algorithm, the first corrected image is obtained. The first corrected image herein is no longer a rectangular image, but an abnormal-shaped image (or referred to as a non-rectangular image). A curved line is corrected into a straight line in the image. However, in this case, a portrait in the image is still deformed to some extent. Usually, a larger field of view of the portrait indicates more severe deformation.

To better correct the deformed portrait, ensure that there is no deformation such as curved content or a discontinuity in the background region while the portrait is corrected, and ensure that for a corrected image, no excessively large field of view loss is caused due to cropping into a rectangular shape, in this embodiment of this application, algorithm constraint correction may be further performed on the first corrected image. An obtained image may be referred to as a second corrected image. In this embodiment, a processing process of algorithm constraint correction may include the following steps S503 to S507.

S503. The terminal recognizes that the first corrected image includes a portrait region in which stretching deformation occurs, a background region, and a field of view edge region. The portrait region in which stretching deformation occurs includes at least a head region in which stretching deformation occurs and a body region in which stretching deformation occurs.

In this embodiment of this application, to better correct the portrait and ensure that there is no significant distortion in a background in a process of correcting the foreground portrait, the image needs to be divided into regions.

For example, the terminal may divide the first corrected image into several specific object regions of interest using an image segmentation method. For example, the image segmentation method may be an image semantic segmentation method in which pixel-level image recognition is automatically performed on the first corrected image using a neural network processing unit (NPU) in the terminal, an object category to which each pixel in the first corrected image belongs is marked, and content in the first corrected image is recognized, to divide the first corrected image into object regions.

As shown in FIG. 8, in an example, the terminal recognizes the first corrected image, and marks the following several regions: the head region of the portrait, the body region of the portrait, the background region, and the field of view edge region. When the first corrected image is an abnormal-shaped image, the terminal recognizes a region outside the first corrected image as an invalid region.

The head region of the portrait covers the head, neck, and an associated ornament (for example, a hat, headwear, or glasses) of each portrait in the image.

The body region of the portrait covers the torso, limbs, clothes, a pant, shoes, and the like of each portrait in the image.

Three foreground portraits are shown in the abnormal-shaped image presented in FIG. 8, and the portraits include respective head regions (which are a head region 1, a head region 2, and a head region 3 in the figure) and body regions (which are a body region 1, a body region 2, and a body region 3 in the figure).

The field of view edge region is an annular strip region that is close to the invalid region, that is located at an edge of the abnormal-shaped image, and that is in the abnormal-shaped image. In implementation, a threshold may be set to determine a width of the strip region.

The background region is a valid region other than the head region and the body region of the portrait, and the field of view edge region in the abnormal-shaped image.

It should be noted that in this embodiment of this application, there is no limitation that the portrait is divided into the head region and the body region, and there may be another division manner. For example, the portrait may be alternatively divided into the head region, a limb region, and a torso region.

S504. The terminal determines initial image matrices respectively corresponding to the head region, the body region, the background region, and the field of view edge region.

For example, the terminal determines an initial position point and color information of a pixel in each of the head region and the body region of each portrait, the background region, and the field of view edge region in the first corrected image. The initial position point of the pixel may be represented using an initial image matrix (or referred to as an initial coordinate matrix), and the color information of the pixel may be represented using a color matrix.

The initial image matrix is used to record a position of each pixel in the first corrected image, and plane position coordinates of a pixel $[i,j]^T$ in an $i^{th}$ column and a $j^{th}$ row in the first corrected image may be expressed as follows:

$$M(i,j)=[u(i,j),v(i,j)]^T.$$

Herein, $u(i,j)$ represents a horizontal coordinate, and $v(i,j)$ represents a vertical coordinate.

The color matrix is used to record color information of each pixel. A color matrix of the pixel in the $i^{th}$ column and the $j^{th}$ row in the first corrected image may be expressed as follows:

$$C(i,j)=[r(i,j),g(i,j),b(i,j)]^T.$$

Herein, $r(i,j)$, $g(i,j)$, and $b(i,j)$ respectively represent red color information, green color information, and blue color information.

To facilitate subsequent operation processing, an initial image matrix of each pixel in the first corrected image may be normalized. It is assumed that a width and a height of the first corrected image are respectively W and H. In this case, a normalized coordinate matrix may be expressed as follows:

$$u0=(j-W/2)/W, v0=(H/2-i)/H.$$

Based on the normalized coordinate matrix, the normalized initial image matrix (which may also be referred to as an image matrix) of each pixel in the first corrected image may be expressed using M0. Details are as follows:

$$M0(i,j)=[u0(i,j),v0(i,j)]^T.$$

The head region and the body region of the portrait differ in stretching deformation amount and deformation manner, and therefore the head region and the body region differ in area, and a user has different tolerance for deformation of the head region and the body region. In this embodiment of this application, to ensure that deformation of both the head region and the body region is well corrected, coordinate processing is further separately performed for the head region and the body region using different projection algorithms.

Figure 10:
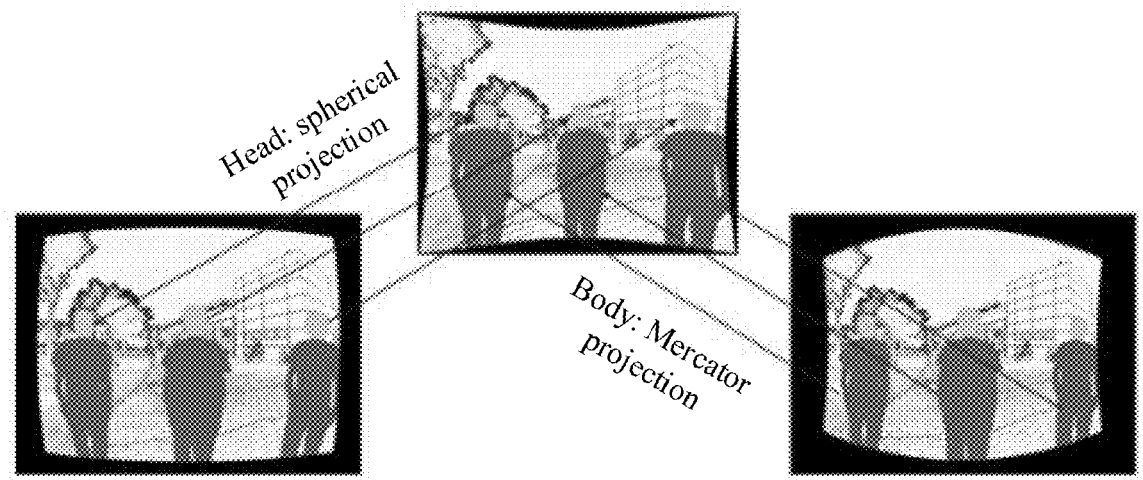
FIG. 10 is a schematic diagram of processing scenarios of a spherical projection algorithm and a Mercator projection algorithm according to an embodiment of this application.

In an embodiment, as shown in FIG. 10, coordinate processing may be performed for the head region of the portrait using a spherical projection algorithm, and coordinate processing may be performed for the body region of the portrait using a Mercator projection algorithm.

Initial image coordinates $M0(i,j)$, where $(i,j)\in$HeadRegion, of the head region in the first corrected image are mapped based on the spherical projection algorithm, and are converted into a first image matrix M1, and M1 is denoted as $M1(i,j)=[u1(i,j), v1(i,j)]^T$.

For example, the spherical projection algorithm for mapping $M0(i,j)=[u0, v0]^T$ to $M1(i,j)=[u1, v1]^T$ may be expressed as follows:

$$u1=\lambda*\tan(0.5\mathrm{atan}(r0))*\cos(\theta0), v1=\lambda*\tan(0.5\mathrm{atan}(r0))*\sin(\theta0).$$

Herein, r0=sqrt (u0*u0+v0*v0), θ0=atan (v0/u0), and λ is a scaling coefficient.

Initial image coordinates M0(i,j), where (i,j)∈BodyRegion, of the body region in the first corrected image are mapped based on the Mercator projection algorithm, and are converted into a second image matrix M2, and M2 is denoted as M2(i,j)=[u2(i,j), v2(i,j)]$^T$, and M2(i,j)=(u2, v2).

For example, the Mercator projection algorithm for mapping M0(i,j)=[u0, v0]$^T$ to M2(i,j)=[u2(i,j), v2(i,j)]$^T$ may be expressed as follows:

$$u2=\lambda*\text{atan}(u0), v2=\lambda*\log(\tan(\pi/4+\phi/2)).$$

Herein, φ=atan (v0/sqrt (u0*u0+1)), and λ is a scaling coefficient.

In this embodiment, M1 obtained by mapping M0 of the head region using the spherical projection algorithm may be used in a subsequent step S505 to correct stretching deformation in the head of the portrait, and M2 obtained by mapping M0 of the body region using the Mercator projection algorithm may be used in the subsequent step S505 to correct stretching deformation in the body of the portrait.

In this embodiment, the head region is corrected using the spherical projection algorithm, such that the head of the portrait in the image looks natural and harmonious in human vision. The body region is corrected using the Mercator projection algorithm, such that the body of the portrait in the image looks straight and harmonious, and is not inclined in human vision. The spherical projection algorithm is combined with the Mercator projection algorithm, such that the entire portrait fits human vision, and the portrait looks natural, harmonious, and non-obtrusive, thereby improving user experience.

It should be noted that in this application, coordinate processing may be performed for the head region and the body region of the portrait using other projection algorithms. For example, an evolved adaptive spherical projection algorithm may be used for the head region, and an adaptive Mercator algorithm may be used for the body region.

S505. The terminal constructs constraint terms respectively corresponding to the head region, the body region, the background region, and the field of view edge region and a regular constraint term.

In this embodiment of this application, the terminal separately constructs the corresponding constraint terms for the head region and the body region of the portrait, the background region, and the field of view edge region, and constructs the regular constraint term used for the global image. The corresponding constraint terms constructed for the head region and the body region of the portrait, the background region, and the field of view edge region and the regular constraint term are jointly used to determine displacement required by each pixel in the image.

The following separately describes the constraint terms of the head region and the body region of the portrait, the background region, and the field of view edge region and the regular constraint term used for the global image.

(1) The constraint term corresponding to the head region of the portrait is used to constrain a target image matrix corresponding to the head region in the second corrected image to approximate an image matrix obtained after geometric transformation is performed on the first image matrix (namely, M1), to correct stretching deformation occurring in the head region. The geometric transformation in this embodiment represents spatial mapping, that is, an image matrix is mapped into another image matrix through transformation. The geometric transformation in this embodiment may be at least one of image translation transformation (Translation), image scaling transformation (Scale), and image rotation transformation (Rotation).

For ease of description, the constraint term corresponding to the head region of the portrait may be referred to as a head constraint term. When there are a plurality of portraits in the image, head regions of different portraits may correspond to different head constraint terms. For example, for the abnormal-shaped image shown in FIG. 8, the head region 1, the head region 2, and the head region 3 may correspond to different head constraint terms.

The head constraint term may be denoted as Term1, and a formula expression of Term1 is as follows:

$$\text{Term1}(i,j) = \text{SUM}_{(i,j) \in \text{HeadRegion}k} \|M0(i,j) + Dt(i,j) - \text{Func1}_k[M1(i,j)]\|.$$

For an image matrix M0(i,j) of a pixel located in the head region (in other words, (i,j) ∈ HeadRegionk), a coordinate value M1(i,j) obtained after facial conformal is [u1(i,j), v1(i,j)]$^T$. Herein, Dt(i,j) represents a displacement matrix corresponding to M0(i,j), k represents a k$^{th}$ head region in the image, Func1$_k$ represents a geometric transformation function corresponding to the k$^{th}$ head region, and ∥ . . . ∥ represents a vector 2 norm.

It needs to be ensured, using the head constraint term Term1(i,j), that under the action of the displacement matrix Dt(i,j), the image matrix M0(i,j) tends to be obtained by performing appropriate geometric transformation on M1(i,j). The geometric transformation includes at least one transformation operation of image rotation, image translation, and image scaling.

The geometric transformation function Func1$_k$ corresponding to the k$^{th}$ head region represents that all pixels in the k$^{th}$ head region share a same geometric transformation function Func1$_k$, and different head regions correspond to different geometric transformation functions. The geometric transformation function Func1$_k$ may be expressed as follows:

$$\text{Func1}_k[M_1(i,j)] = \begin{bmatrix} u1'(i,j) \\ v1'(i,j) \end{bmatrix} = \rho_{1k} * \begin{bmatrix} \cos\theta_{1k} & -\sin\theta_{1k} \\ \sin\theta_{1k} & \cos\theta_{1k} \end{bmatrix} * \begin{bmatrix} u1(i,j) \\ v1(i,j) \end{bmatrix} + \begin{bmatrix} TX_{1k} \\ TY_{1k} \end{bmatrix}.$$

Herein, $\rho_{1k}$ represents a scaling coefficient of the k$^{th}$ head region, $\theta_{1k}$ represents a rotation angle of the k$^{th}$ head region, and $TX_{1k}$ and $TY_{1k}$ respectively represent horizontal displacement and vertical displacement of the k$^{th}$ head region.

Term1(i,j) may be expressed as follows:

$$\text{Term1}(i,j) = \text{SUM}_{(i,j)\in\text{HeadRegion}k} \left\| \begin{bmatrix} u0(i,j) \\ v0(i,j) \end{bmatrix} + \begin{bmatrix} du(i,j) \\ dv(i,j) \end{bmatrix} - \begin{bmatrix} u1'(i,j) \\ v1'(i,j) \end{bmatrix} \right\| =$$

$$\text{SUM}_{(i,j)\in\text{HeadRegion}k} \left\| \begin{bmatrix} u0(i,j) + du(i,j) - u1'(i,j) \\ v0(i,j) + dv(i,j) - v1'(i,j) \end{bmatrix} \right\| = \text{SUM}_{(i,j)\in\text{HeadRegion}k}$$

$$\left\{ \sqrt{(u0(i,j) + du(i,j) - u1'(i,j))^2 + (v0(i,j) + dv(i,j) - v1'(i,j))^2} \right\}$$

Herein, du(i,j) and dv(i,j) are unknowns that need to be solved. When a constraint equation is subsequently solved, it needs to be ensured that this term is as small as possible.

(2) The constraint term corresponding to the body region is used to constrain a target image matrix corresponding to the body region in the second corrected image to approximate an image matrix obtained after geometric transformation is performed on the second image matrix (namely, M2), to correct stretching deformation occurring in the body region. The geometric transformation in this embodiment may be at least one of image translation transformation, image scaling transformation, and image rotation transformation.

For ease of description, the constraint term corresponding to the body region of the portrait may be referred to as a body constraint term. When there are a plurality of portraits in the image, body regions of different portraits may correspond to different body constraint terms. For example, for the abnormal-shaped image shown in FIG. 8, the body region 1, the body region 2, and the body region 3 may correspond to different body constraint terms.

The body constraint term may be denoted as Term2, and a formula expression of Term2 is as follows:

$$\text{Term2}(i,j) = \text{SUM}_{(i,j) \in BodyRegionk} \| M0(i,j) + Dt(i,j) - \text{Func2}_k[M2(i,j)] \|.$$

For a pixel $M0(i,j)$ located in the head region (in other words, $(i,j) \in \text{BodyRegionk}$), a coordinate value $M2(i,j)$ obtained after body conformal is $[u2(i,j), v2(i,j)]^T$. Herein, $Dt(i,j)$ represents a displacement matrix corresponding to $M0(i,j)$, k represents a $k^{th}$ body region in the image, $\text{Func2}_k$ represents a geometric transformation function corresponding to the $k^{th}$ body region, and $\| \ldots \|$ represents a vector 2 norm.

It needs to be ensured, using the body constraint term, that under the action of the displacement matrix $Dt(i,j)$, the image matrix $M0(i,j)$ tends to be obtained by performing appropriate geometric transformation on $M2(i,j)$. The geometric transformation includes at least one transformation operation of image rotation, image translation, and image scaling.

The geometric transformation function $\text{Func2}_k$ corresponding to the $k^{th}$ body region represents that all pixels in the $k^{th}$ body region share a same geometric transformation function $\text{Func2}_k$, and different body regions correspond to different geometric transformation functions. The geometric transformation function $\text{Func2}_k$ may be expressed as follows:

$$\text{Func2}_k[M2(i,j)] = \begin{bmatrix} u2'(i,j) \\ v2'(i,j) \end{bmatrix} = \rho_{2k} * \begin{bmatrix} \cos\theta_{2k} & -\sin\theta_{2k} \\ \sin\theta_{2k} & \cos\theta_{2k} \end{bmatrix} * \begin{bmatrix} u2(i,j) \\ v2(i,j) \end{bmatrix} + \begin{bmatrix} TX_{2k} \\ TY_{2k} \end{bmatrix}.$$

Herein, $\rho_{2k}$ represents a scaling coefficient of the $k^{th}$ body region, $\theta_{2k}$ represents a rotation angle of the $k^{th}$ body region, and $TX_{2k}$ and $TY_{2k}$ respectively represent horizontal displacement and vertical displacement of the $k^{th}$ body region.

Term2(i,j) may be expressed as follows:

$$\text{Term2}(i,j) = \text{SUM}_{(i,j) \in BodyRegionk} \left\| \begin{bmatrix} u0(i,j) \\ v0(i,j) \end{bmatrix} + \begin{bmatrix} du(i,j) \\ dv(i,j) \end{bmatrix} - \begin{bmatrix} u2'(i,j) \\ v2'(i,j) \end{bmatrix} \right\| =$$

$$\text{SUM}_{(i,j) \in BodyRegionk} \left\| \begin{bmatrix} u0(i,j) + du(i,j) - u2'(i,j) \\ v0(i,j) + dv(i,j) - v2'(i,j) \end{bmatrix} \right\| = \text{SUM}_{(i,j) \in BodyRegionk}$$

$$\left\{ \sqrt{(u0(i,j) + du(i,j) - u2'(i,j))^2 + (v0(i,j) + dv(i,j) - v2'(i,j))^2} \right\}$$

Herein, $du(i,j)$ and $dv(i,j)$ are unknowns that need to be solved. When the constraint equation is subsequently solved, it needs to be ensured that this term is as small as possible.

(3) The constraint term corresponding to the field of view edge region is used to constrain a pixel in an initial image matrix corresponding to the field of view edge region in the first corrected image to be displaced along an edge of the first corrected image or towards an outer side of the first corrected image, to maintain or expand the field of view edge region.

For ease of description, the constraint term corresponding to the field of view edge region may be referred to as a field of view edge constraint term. The field of view edge constraint term may be denoted as Term3, and a formula expression of Term3 is as follows:

$$\text{Term3}(i,j) = \text{SUM}_{(i,j) \in EdgeRegion} \| M0(i,j) + Dt(i,j) - \text{Func3}_{(i,j)}[M0(i,j)] \|.$$

Herein, $M0(i,j)$ represents image coordinates of a pixel located in the field of view edge region (in other words, $(i,j) \in \text{EdgeRegion}$), $Dt(i,j)$ represents a displacement matrix corresponding to $M0(i,j)$, $\text{Func3}_{(i,j)}$ represents a displacement function of $M0(i,j)$, and $\| \ldots \|$ represents a vector 2 norm.

It needs to be ensured, using the field of view edge constraint term, that under the action of the displacement matrix $Dt(i,j)$, the image matrix $M0(i,j)$ tends to be obtained after the coordinate value $M0(i,j)$ is approximately displaced. A displacement rule is to approximately move the pixel only along the edge region or towards the outer side of the edge region, and avoid moving the pixel towards an inner side of the edge region, such that an image information loss caused by subsequent cropping into a rectangular shape can be minimized, and image content in the field of view edge region can even be expanded.

Figure 11:
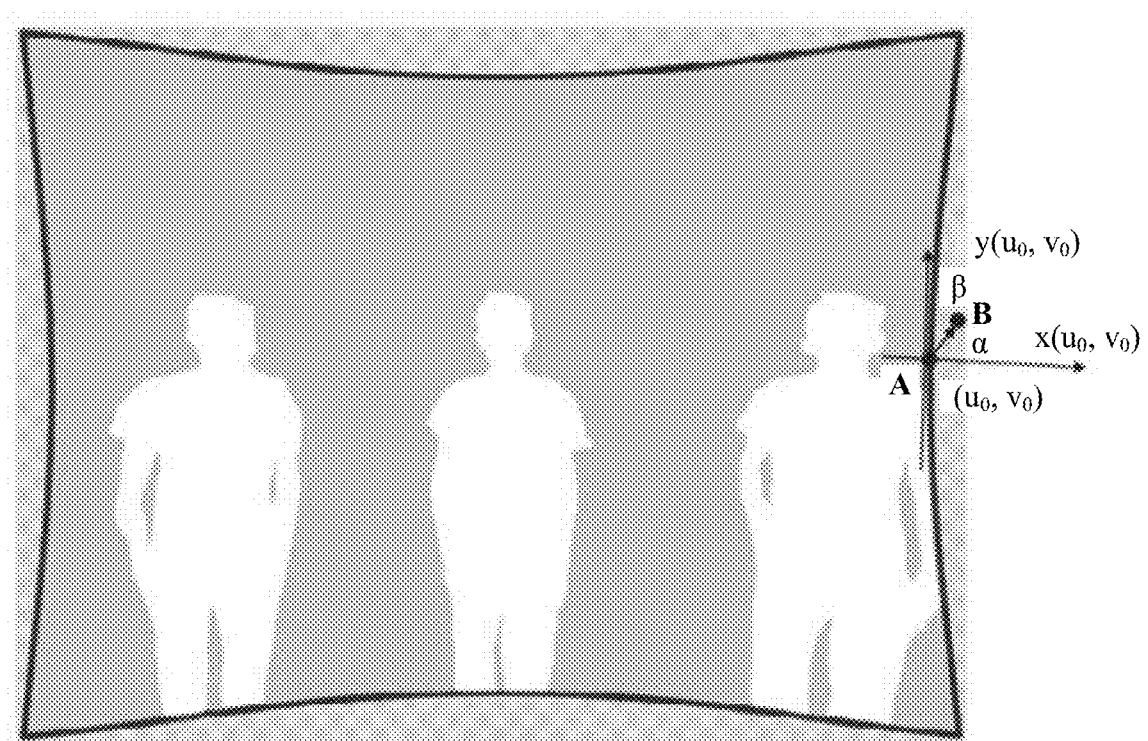
FIG. 11 is a schematic diagram of a processing scenario of a field of view edge region in an image according to an embodiment of this application.

As shown in FIG. 11, it is assumed that image coordinates of a pixel A located in the field of view edge region in the abnormal-shaped image are $[u0, v0]^T$, a tangent vector of the pixel A along a field of view boundary is expressed as $y(u0, v0)$, and a normal vector towards the outer side of the image is expressed as $x(u0, v0)$. When a boundary region is known, $x(u0, v0)$ and $y(u0, v0)$ are also known. In this case, $\text{Func3}(i,j)$ may be expressed as follows:

$$\text{Func3}_{(i,j)}[M_0(i,j)] = \begin{bmatrix} u0(i,j) + \alpha(u0(i,j), v0(i,j)) * x(u0(i,j), v0(i,j)) \\ v0(i,j) + \beta(u0(i,j), v0(i,j)) * y(u0(i,j), v0(i,j)) \end{bmatrix}.$$

Herein, there is a limitation that $\alpha(u0, v0)$ needs to be not less than 0, to ensure that the pixel is not displaced towards the inner side of the field of view edge region, a symbol of $\beta(u0, v0)$ does not need to be limited, and $\alpha(u0, v0)$ and $\beta(u0, v0)$ are intermediate unknowns that do not need to be explicitly solved.

Term3(i,j) may be expressed as follows:

$$\text{Term3}(i,j) = \text{SUM}_{(i,j) \in EdgeRegion}$$

$$\left\| \begin{bmatrix} u0(i,j) \\ v0(i,j) \end{bmatrix} + \begin{bmatrix} du(i,j) \\ dv(i,j) \end{bmatrix} - \begin{bmatrix} u0(i,j) + \alpha(u0, v0) * x(u0, v0) \\ v0(i,j) + \beta(u0, v0) * y(u0, v0) \end{bmatrix} \right\| =$$

$$\text{SUM}_{(i,j) \in EdgeRegion} \left\| \begin{bmatrix} u0(i,j) + du(i,j) - u0(i,j) - \alpha(u0, v0) * x(u0, v0) \\ v0(i,j) + dv(i,j) - v0(i,j) - \beta(u0, v0) * y(u0, v0) \end{bmatrix} \right\| =$$

$$\text{SUM}_{(i,j) \in EdgeRegion}$$

$$\left\{ \sqrt{\begin{matrix} (u0(i,j) + du(i,j) - u0(i,j) - \alpha(u0, v0) * x(u0, v0))^2 + \\ (v0(i,j) + dv(i,j) - v0(i,j) - \beta(u0, v0) * y(u0, v0))^2 \end{matrix}} \right\}$$

Herein, du(i,j) and dv(i,j) are unknowns that need to be solved. When the constraint equation is subsequently solved, it needs to be ensured that this term is as small as possible.

(4) The constraint term corresponding to the background region is used to constrain a pixel in an image matrix corresponding to the background region in the first corrected image to be displaced and a first vector corresponding to the pixel before displacement and a second vector corresponding to the pixel after displacement to be parallel to each other as much as possible, such that the image content in the background region is smooth and continuous, and the image content throughout the portrait in the background region is continuous and consistent in human vision. The first vector represents a vector between the pixel before displacement and a neighboring pixel corresponding to the pixel before displacement, and the second vector represents a vector between the pixel after displacement and a neighboring pixel corresponding to the pixel after displacement.

For ease of description, the constraint term corresponding to the background region may be referred to as a background constraint term. The background constraint term may be denoted as Term4, and a formula expression of Term4 is as follows:

$$\text{Term4}(i,j) = \text{SUM}_{(i,j) \in BkgRegion}\{\text{Func4}_{(i,j)}(M0(i,j), M0(i,j)+Dt(i,j))\}.$$

Herein, M0(i,j) represents image coordinates of a pixel located in the background region (in other words, (i,j) ∈ BkgRegion), Dt(i,j) represents a displacement matrix corresponding to M0(i,j), Func4$_{(i,j)}$ represents a displacement function of M0(i,j), and ‖ . . . ‖ represents a vector 2 norm.

Figure 12:
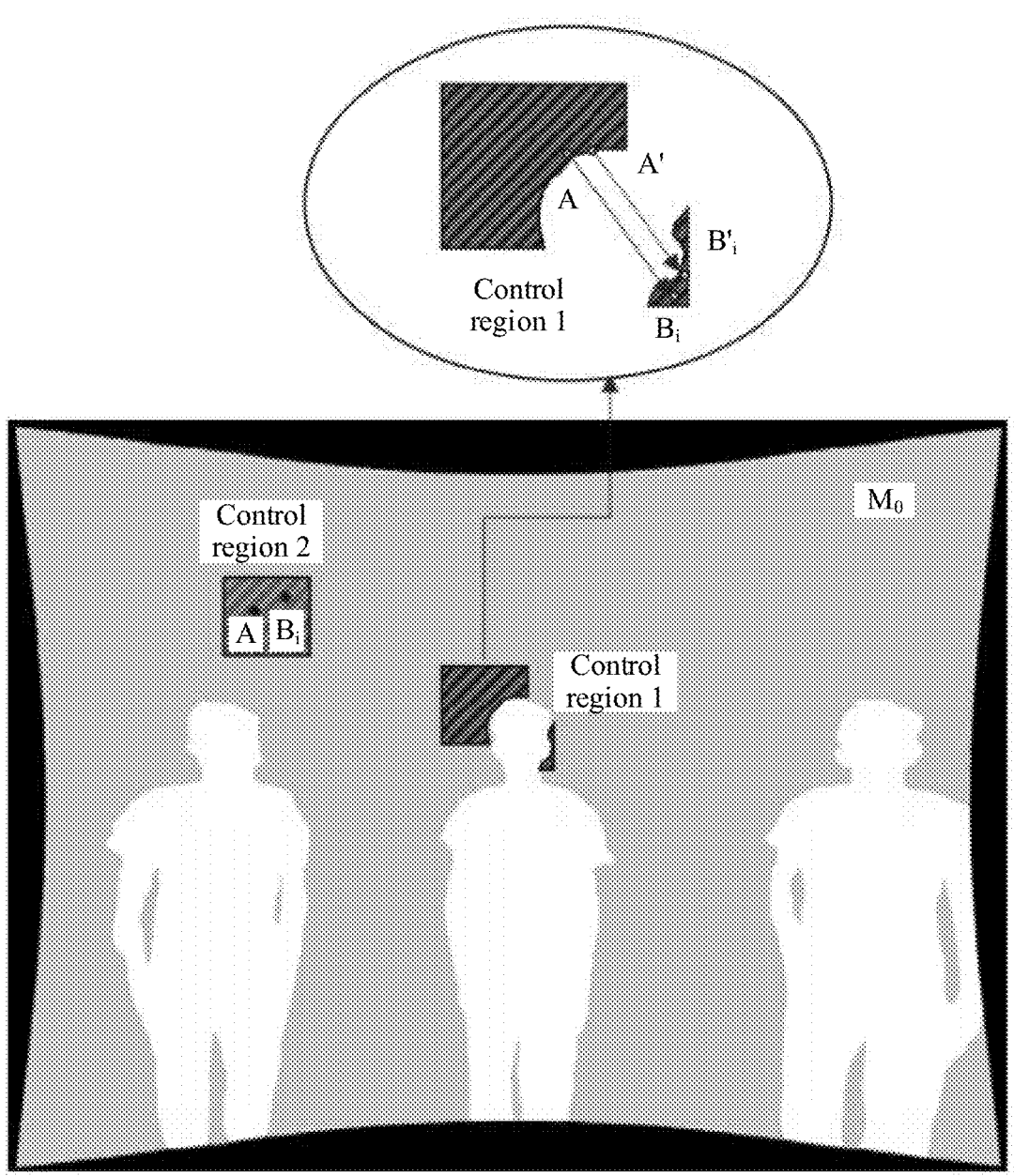
FIG. 12 is a schematic diagram of a processing scenario of a background region in an image according to an embodiment of this application.

It needs to be ensured, using the background constraint term, that under the action of the displacement matrix Dt(i,j), the coordinate value M0(i,j) tends to be obtained after the coordinate value M0(i,j) is approximately displaced. In this embodiment of this application, pixels in the background region may be grouped into different control regions. A size, shape, and quantity of control regions are not limited in this application. In particular, a control region of a background pixel located at a boundary between the foreground portrait and the background needs to extend across the foreground portrait to the other end of the foreground portrait. As shown in FIG. 12, there is a rectangular control region 2 and a non-rectangular control region 1. The control region 1 is used as an example. It is assumed that there is a background pixel A and a control region, namely, a pixel set {Bi}, of the pixel A, the control region is a neighboring of the pixel A, and the control region of the pixel A extends across a head region of a portrait at a middle position to the other end of the head region. Bi represents a neighboring pixel of A, and A and Bi are respectively moved to A' and {B'i} when A and Bi are displaced. A displacement rule is that the background constraint term is used to constrain a vector ABi and a vector A'B'i to be parallel to each other in terms of a direction, such that it can be ensured that a smooth transition is implemented between the foreground portrait and the background region, and the image content throughout the portrait in the background region can be continuous and consistent in human vision, to avoid a phenomenon such as distortion/deformation, a hole, or a phenomenon of interlacing in a background image. In this case, Func4$_{(i,j)}$ may be expressed as follows:

$$\text{Func4}_{(i,j)}[M_0(i,j), M_0(i,j) + Dt(i,j)] =$$

$$\text{Func4}_{(i,j)}\left[\begin{bmatrix} u0(i,j) \\ v0(i,j) \end{bmatrix}, \begin{bmatrix} u0(i,j) + du(i,j) \\ v0(i,j) + dv(i,j) \end{bmatrix}\right] =$$

$$SUM_{(i+di,j+dj) \in CtrlRegion}\{\text{angle }[vec1, vec2]\}$$

Herein, $$vec1 = \begin{bmatrix} u0(i,j) - u0(i+di, j+dj) \\ v0(i,j) - v0(i+di, j+dj) \end{bmatrix};$$

$$vec2 = \begin{bmatrix} u0(i,j) + du(i,j) - u0(i+di, j+dj) - du(i+di, j+dj) \\ v0(i,j) + dv(i,j) - v0(i+di, j+dj) - dv(i+di, j+dj) \end{bmatrix}; \text{ and}$$

$$\text{angle }[vec1, vec2] = \arccos\left(\frac{vec1 \cdot vec2}{|vec1| \cdot |vec2|}\right).$$

Herein, angle [ ] represents an angle between two vectors, vec1 represents a vector that includes a background pixel $[i,j]^T$ before correction and a point in a control region of the pixel, vec2 represents a vector that includes the background pixel $[i,j]^T$ after correction and a corrected pixel in the control region of the pixel, and $\text{SUM}_{(i+di,j+dj) \in CtrlRegion}$ represents summation of angles between all vectors in the control region.

Term4(i,j) may be expressed as follows:

$$\text{Term4}(i,j) = \text{SUM}_{(i,j) \in BkgRegion}\{\text{SUM}_{(i+di,j+dj) \in CtrlRegion}\{\text{angle}[vec1,vec2]\}\}.$$

Herein, du(i,j) and dv(i,j) are unknowns that need to be solved. When the constraint equation is subsequently solved, it needs to be ensured that this term is as small as possible.

(5) The regular constraint term is used to constrain a difference between displacement matrices of any two adjacent pixels in displacement matrices respectively corresponding to the background region, the head region of the portrait, the body region of the portrait, and the field of view edge region in the second corrected image is less than a preset threshold, such that global image content of the second corrected image is smooth and continuous.

The regular constraint term may be denoted as Term5, and a formula expression of Term5 is as follows:

$$\text{Term5}(i,j) = \text{SUM}_{(i,j) \in AllRegion}\{\text{Func5}_{(i,j)}(Dt(i,j))\}.$$

For pixels M0(i,j) in an entire image range (in other words, (i,j)∈ AllRegion), it needs to be ensured, using the regular constraint term, that displacement matrices Dt(i,j) of adjacent pixels are smooth and continuous, to avoid a great local change. A constraint principle is that a difference between displacement at a pixel $[i,j]^T$ and displacement at a neighboring pixel (i+di, j+dj) should be as small as possible (in other words, less than a specific threshold). In this case, Func5$_{(i,j)}$ may be expressed as follows:

$$\text{Func5}_{(i,j)}(Dt(i,j)) = SUM_{(i+di,j+dj) \in NeighborRegion}$$

$$\left\{\sqrt{(du(i,j) - du(i+di, j+dj))^2 + (dv(i,j) - dv(i+di, j+dj))^2}\right\}.$$

Term5(i,j) may be expressed as follows:

$$\text{Term5}(i,j) = SUM_{(i,j) \in AllRegion}\left\{SUM_{(i+di,j+dj) \in NeighborRegion}\right.$$

$$\left.\left\{\sqrt{(du(i,j) - du(i+di, j+dj))^2 + (dv(i,j) - dv(i+di, j+dj))^2}\right\}\right\}.$$

Herein, du(i,j) and dv(i,j) are unknowns that need to be solved. When the constraint equation is subsequently solved, it needs to be ensured that this term is as small as possible.

S506. The terminal obtains displacement matrices respectively corresponding to the regions based on the constraint terms and weight coefficients corresponding to the constraint terms.

For example, the terminal may set the weight coefficients for the constraint terms of the head region and the body region of the portrait, the field of view edge region, and the background region and the regular constraint term, establish a constraint equation based on the constraint terms and the corresponding weight coefficients, and solve the constraint equation, to obtain an offset of each position point in each region.

It is assumed that a coordinate matrix (which may also be referred to as a target image matrix) of an image (namely, the second corrected image) obtained after algorithm constraint correction is Mt(i,j), where Mt(i,j)=[ut(i,j), vt(i,j)]$^T$. A displacement matrix of the second corrected image with respect to the image matrix M0(i,j) is Dt(i,j), where Dt(i,j)=[du(i,j), dv(i,j)]$^T$. In other words, $$Mt(i,j)=M0(i,j)+Dt(i,j);$$

$$ut(i,j)=u0(i,j)+du(i,j); \text{ and}$$

$$vt(i,j)=v0(i,j)+dv(i,j).$$

The weight coefficients are assigned to the constraint terms, and the following constraint equation is constructed:

$$Dt(i,j)=(du(i,j),dv(i,j))=\text{argmin}(\alpha1(i,j)*\text{Term1}(i,j)+\alpha2(i,j)*\text{Term2}(i,j)+\alpha3(i,j)*\text{Term3}(i,j)+\alpha4(i,j)*\text{Term4}(i,j)+\alpha5(i,j)*\text{Term5}(i,j)).$$

Herein, α1(i,j) to α5(i,j) are the weight coefficients (weight matrices) respectively corresponding to Term1 to Term5.

A displacement matrix Dt(i,j) of each pixel in the image is finally obtained by solving the constraint equation using a least square method, a gradient descent method, or various improved algorithms.

In an embodiment, each of α1(i,j) to α5(i,j) may be set to a fixed weight value.

In still another embodiment, a correction process is equivalent to selecting a balance point in foreground and background correction, and therefore the weight coefficient may be adaptively generated based on the image content, to implement local weight control. A principle of adaptively configuring the weight coefficient may include but is not limited to at least one of the following:

An image area occupied by the head region of the portrait in the first corrected image is configured to be positively correlated with the weight coefficient corresponding to the head constraint term; and an image area occupied by the body region of the portrait in the first corrected image is configured to be positively correlated with the weight coefficient corresponding to the body constraint term.

That is, when the head region or the body region occupies a large image area, a weight value of the head constraint term or the body constraint term of the corresponding region may be increased because a portrait with a large area is more sensitive to deformation.

A field of view of the head region in the first corrected image is configured to be positively correlated with the weight coefficient corresponding to the head constraint term; and a field of view of the body region in the first corrected image is configured to be positively correlated with the weight coefficient corresponding to the body constraint term.

That is, when the head region or the body region is a region with a large field of view, the weight value of the head constraint term or the body constraint term of the corresponding region may be increased because a portrait with a large field of view tends to be more severely deformed.

Texture significance of the background region in the first corrected image is positively correlated with the weight coefficient corresponding to the background constraint term.

That is, when there are weak texture details for the background region, a weight of the background constraint term of the corresponding region may be decreased because the background region is insensitive to distortion or a fault caused by correction, to better correct the foreground portrait.

A weight coefficient corresponding to the field of view edge constraint term when there is portrait content in the field of view edge region in the first corrected image is configured to be greater than a weight coefficient corresponding to the field of view edge constraint term when there is no portrait content in the field of view edge region.

That is, when there is a portrait on a field of view edge of the image, a weight value of the edge constraint term of the corresponding region may be increased because boundary constraint may affect a correction effect of the foreground portrait, to better correct the foreground portrait.

S507. The terminal obtains the second corrected image through color mapping based on the initial image matrices and the displacement matrices respectively corresponding to the regions.

In implementation, after the displacement matrix Dt(i,j) of each pixel in the image is obtained, the terminal obtains a target image matrix Mt(i,j) of the pixel in each region in the first corrected image based on the image matrix M0(i,j) and the displacement matrix Dt(i,j) corresponding to the pixel in each region in the first corrected image, where Mt(i,j)=M0(i,j)+Dt(i, j). Then, an image of target resolution (it is assumed as Wt*Ht) is generated based on the target image matrix Mt(i,j) and a color matrix C(i,j), that is, the second corrected image (namely, a new abnormal-shaped image of Wt*Ht) is obtained. For example, normalized Mt(i,j)=[ut(i,j), vt(i,j)]$^T$ may be converted into actual image coordinates [it, jt]$^T$. A conversion rule is as follows:

$$it=Ht/2-vt*Ht; \text{ and}$$

$$jt=ut*Wt+Wt/2.$$

After the actual image coordinates [it, jt]$^T$ are obtained, the color matrix C(i,j) of the pixel [i,j]$^T$ in the first corrected image may be supplemented to the pixel [it, jt]$^T$ in the second corrected image. Because [it, jt]$^T$ may be a decimal, interpolation rounding further needs to be performed on [it, jt]$^T$ in some implementations. Commonly used interpolation rounding algorithms include a linear interpolation algorithm, a Lanczos interpolation algorithm, and the like. This is not limited in this application.

S508. The terminal crops the second corrected image into a rectangular image, and outputs the rectangular image.

Figure 13:
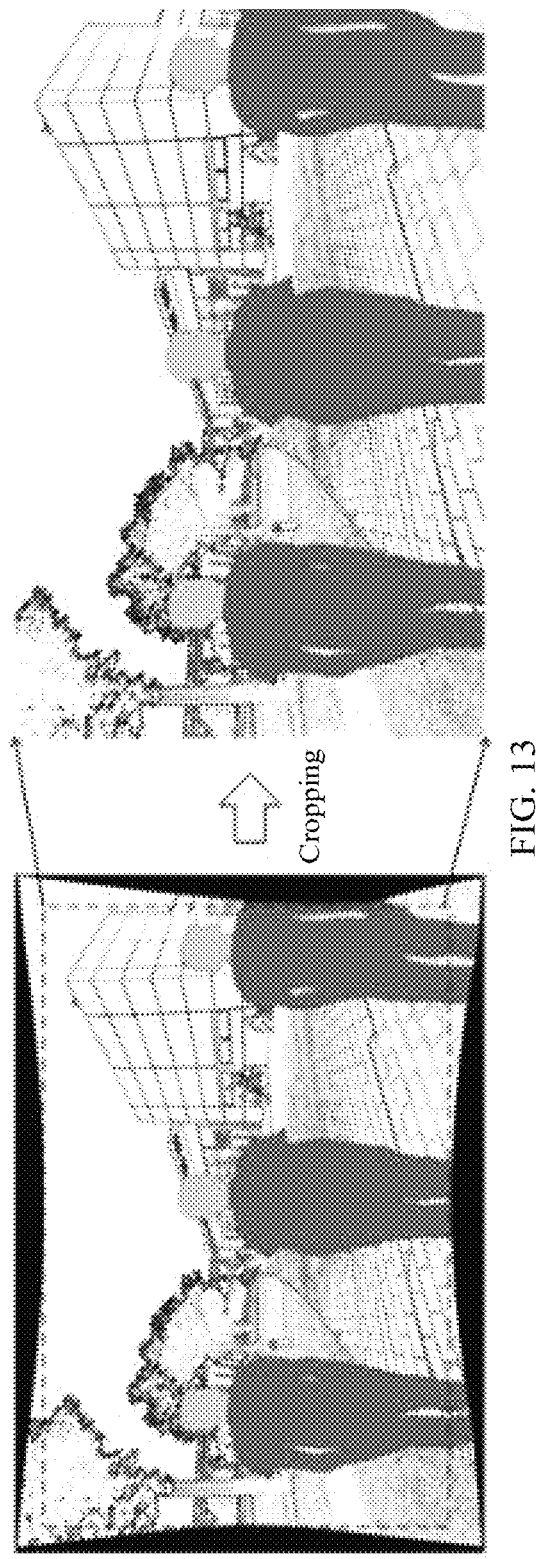
FIG. 13 is a schematic diagram of a scenario in which an abnormal-shaped image is cropped and enlarged according to an embodiment of this application.

In this embodiment, the second corrected image obtained in step 507 is an abnormal-shaped image (a non-rectangular image) of Wt*Ht. Therefore, cropping and scaling processing further need to be performed on the abnormal-shaped image, and a rectangular image of the target resolution is output. In an example, as shown in FIG. 13, cropping may be performed at an edge position of the abnormal-shaped image along a dashed line of a rectangular, to obtain a rectangular region, and the rectangular region is enlarged to resolution of Wt*Ht, to obtain the rectangular image of Wt*Ht.

It may be learned that in this embodiment of this application, the terminal may perform, by region (including the head region, the body region, the background region, and the field of view edge region), algorithm constraint correction processing on the abnormal-shaped image obtained after optical distortion correction, separately perform shape correction on the head region and the body region of the portrait based on different projection algorithms, and separately set independent constraint terms to optimize a solution, to ensure that the portrait is best corrected. For the background region, a position relationship between a background pixel and a pixel in a control region of the background pixel before and after transformation is constrained, to ensure that no background distortion or discontinuity occurs in the image content in the background region due to foreground correction. For the field of view edge region, content adaptive boundary control is used. In this way, there is no problem of a field of view loss, and a field of view boundary can even be expanded, to minimize a content loss caused by cropping and the problem of a field of view loss. Therefore, implementing this embodiment of this application can ensure that after the image is corrected, both the portrait and the background content are natural, continuous, and harmonious, and fit a human visual habit. In this way, user experience is greatly improved, and there are great commercial application benefits.

To better understand the foregoing solution, the following describes the solution with reference to an actual application scenario.

Figure 14A:
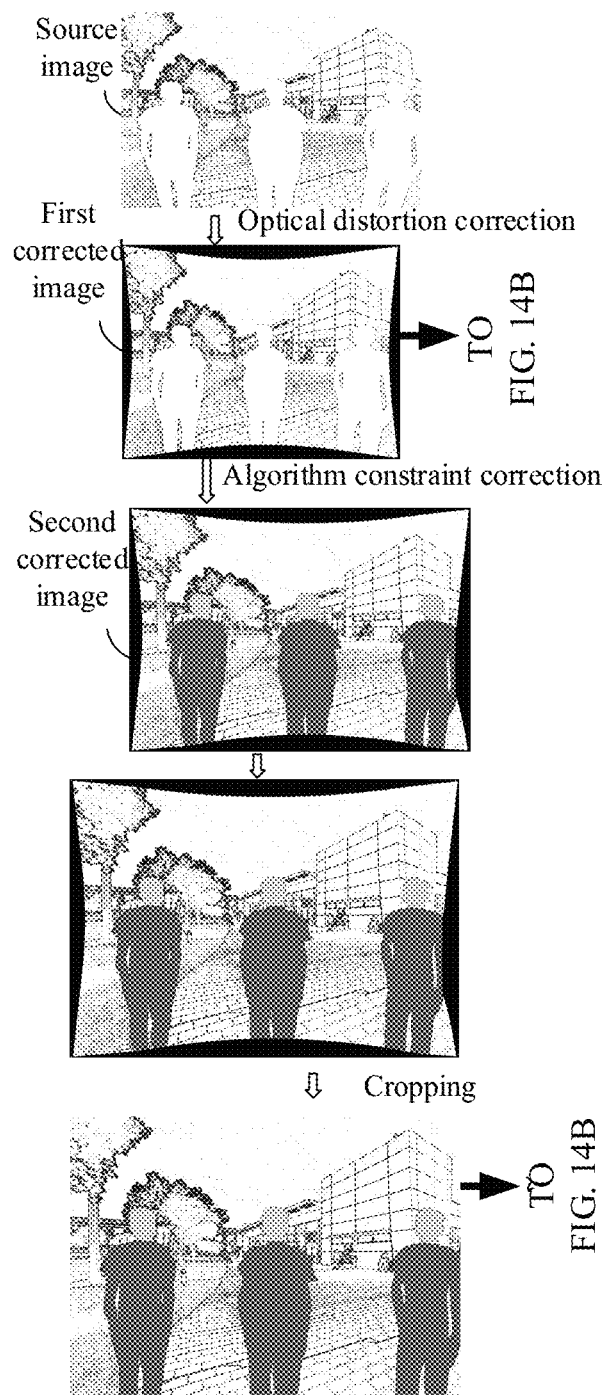
FIG. 14A and FIG. 14B are a schematic diagram of a processing procedure of an application scenario in which a mobile phone takes a photo according to an embodiment of this application.
Figure 14B:
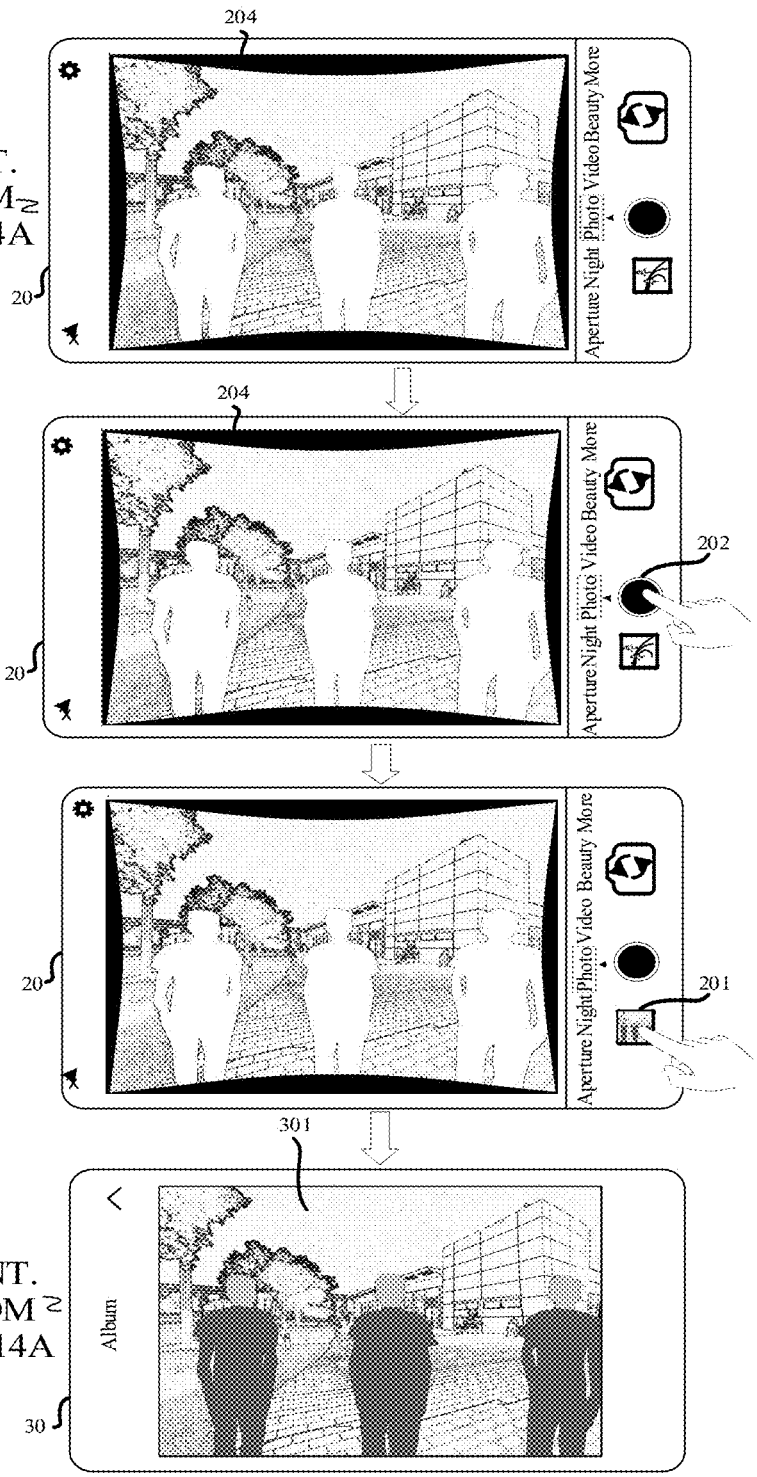
Figure 14B:
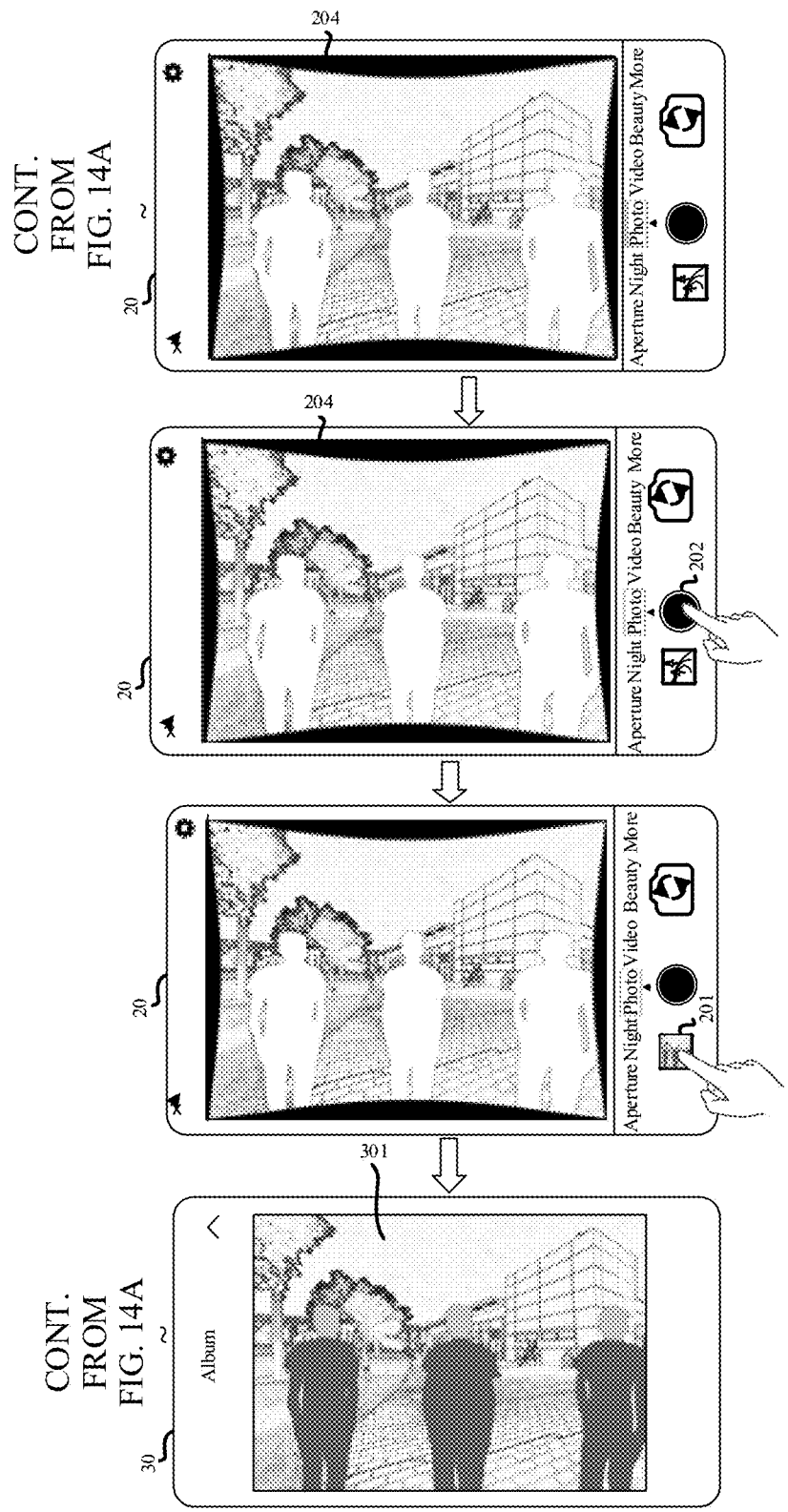

Referring to FIG. 14A and FIG. 14B, in an example scenario, an example in which a terminal is a smartphone is used. When a user needs to take a photo using the mobile phone, the user opens a photographing app in the mobile phone, and a display interface 20 of the photographing app is presented on a display panel of the mobile phone. The photographing app drives a camera apparatus of the mobile phone to collect a source image in real time. Optical distortion correction is performed on the source image in a processor, to obtain a first corrected image, and the first corrected image is displayed in a preview box 204 on the display interface 20. When the user taps a photographing control 202 on the display interface 20, the processor performs algorithm constraint correction on the first corrected image, to obtain a second corrected image, crops the second corrected image into a rectangular image, and stores the rectangular image, for example, stores the rectangular image in an album. In this way, when the user taps an image browsing control 201 on the display interface 20, the mobile phone switches to a display interface 30 of an album app, and displays the rectangular image on the display interface 30. It may be learned that the mobile phone automatically corrects the image, and therefore a correction process is basically not perceived by the user. The user can view a rectangular image effect with both an excellent portrait effect and an excellent background effect in a timely manner after completing photographing, thereby greatly improving user experience.

Figure 15:
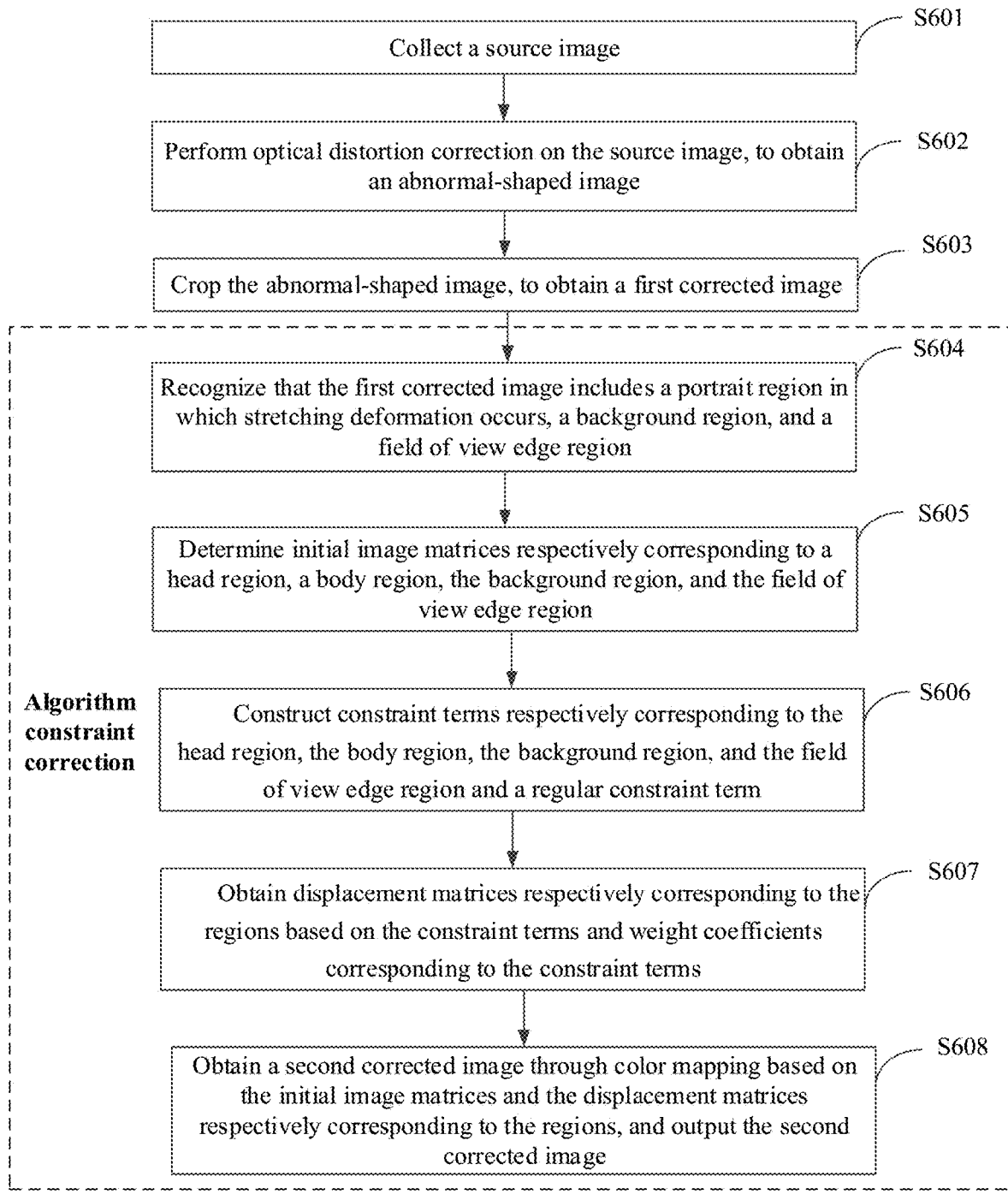
FIG. 15 is a schematic flowchart of still another image distortion correction method according to an embodiment of this application.

FIG. 15 is a schematic flowchart of still another image distortion correction method according to an embodiment of this application. In some implementations, the method may be applied to the terminal shown in FIG. 2, or FIG. 3. A main difference between the method embodiment in FIG. 15 and the method embodiment in FIG. 9 lies in that in the embodiment in FIG. 15, an abnormal-shaped image obtained after optical distortion correction is first cropped to obtain a rectangular image, and then algorithm constraint correction is further performed on the rectangular image. As shown in FIG. 15, the method includes but is not limited to the following steps.

S601. The terminal collects a source image.

S602. The terminal performs optical distortion correction on the source image, to obtain an abnormal-shaped image.

For content of S601 and S602, refer to the description of S501 and S502 in the embodiment in FIG. 9. For brevity of this specification, details are not described herein.

S603. The terminal crops the abnormal-shaped image, to obtain a first corrected image.

For example, in this embodiment, the abnormal-shaped image obtained in step 602 is an abnormal-shaped image (non-rectangular image) of Wt*Ht. The abnormal-shaped image may be cropped along an edge position to obtain a rectangular region, and the rectangular region is enlarged to resolution of Wt*Ht, to obtain a rectangular image of Wt*Ht, namely, the first corrected image.

In an example, for implementation of cropping and enlargement processing in this step, refer to the description of the embodiment in FIG. 13. Details are not described herein.

S604. The terminal recognizes that the first corrected image includes a portrait region in which stretching deformation occurs, a background region, and a field of view edge region. The portrait region in which stretching deformation occurs includes at least a head region in which stretching deformation occurs and a body region in which stretching deformation occurs.

S605. The terminal determines initial image matrices respectively corresponding to the head region, the body region, the background region, and the field of view edge region.

For implementation content of S604 and S605, refer to the description of S503 and S504 in the embodiment in FIG. 9. A main difference lies in that herein, it is the first corrected rectangular image while there is the abnormal-shaped image in the embodiment in FIG. 9. For brevity of this specification, details are not described herein.

S606. The terminal constructs constraint terms respectively corresponding to the head region, the body region, the background region, and the field of view edge region and a regular constraint term.

In this step, for the head constraint term, the body constraint term, the background constraint term, and the regular constraint term, refer to related description of S505 in the embodiment in FIG. 9. Details are not described herein.

However, in this step, the targeted first corrected image is a rectangular image, and the field of view edge region of the first corrected image is a rectangular edge region. Therefore, an implementation process of the field of view edge constraint term in this step is different from the implementation process of the field of view edge constraint term in S505 in the embodiment in FIG. 9.

In this embodiment, the field of view edge constraint term is used to constrain a pixel in the initial image matrix corresponding to the field of view edge region in the first corrected image is displaced along an edge of the first corrected image, to maintain the field of view edge region.

If the field of view edge constraint term is denoted as Term3, a formula expression of Term3 herein is as follows:

$$\text{Term3}(i,j) = \text{SUM}_{(i,j) \in EdgeRegion} \| M0(i,j) + Dt(i,j) - \text{Func3}_{(i,j)}[M0(i,j)] \|.$$

Herein, M0(i,j) represents image coordinates of a pixel located in the field of view edge region (in other words, (i,j)∈ EdgeRegion), Dt(i,j) represents a displacement matrix corresponding to M0(i,j), $Func3_{(i,j)}$ represents a displacement function of M0(i,j), and ∥ . . . ∥ represents a vector 2 norm.

It needs to be ensured, using the field of view edge constraint term, that under the action of the displacement matrix Dt(i,j), the image matrix M0(i,j) tends to be obtained after the coordinate value M0(i,j) is approximately displaced. A displacement rule is to move the pixel only along an edge region of the image, and avoid moving the pixel towards an inner side or an outer side of the image, to minimize an image information loss caused by subsequent cropping into a rectangular shape.

Figure 16:
FIG. 16 is still another schematic diagram of a processing scenario of a field of view edge region in an image according to an embodiment of this application.

As shown in FIG. 16, it is assumed that image coordinates of a pixel A located in the field of view edge region are $[u0, v0]^T$, and a tangent vector of the pixel A along a field of view boundary is expressed as y(u0, v0). When a boundary region is known, y(u0, v0) is also known. In this case, Func3(i,j) may be expressed as follows:

$$Func3_{(i,j)}[M_0(i, j)] = \begin{bmatrix} u0(i, j) \\ v0(i, j) + \beta(u0(i, j), v0(i, j)) * y(u0(i, j), v0(i, j)) \end{bmatrix}$$

A symbol of β(u0, v0) does not need to be limited, to ensure that the pixel can be moved along the boundary. Term3 may be expressed as follows:

$$Term3(i, j) = SUM_{(i,j) \in EdgeRegion} \left\| \begin{bmatrix} u0(i, j) \\ v0(i, j) \end{bmatrix} + \begin{bmatrix} du(i, j) \\ dv(i, j) \end{bmatrix} - \begin{bmatrix} u0(i, j) \\ v0(i, j) + \beta(u0, v0) * y(u0, v0) \end{bmatrix} \right\| =$$

$$SUM_{(i,j) \in EdgeRegion} \left\| \begin{bmatrix} u0(i, j) + du(i, j) - u0(i, j) \\ v0(i, j) + dv(i, j) - v0(i, j) - \beta(u0, v0) * y(u0, v0) \end{bmatrix} \right\| =$$

$$SUM_{(i,j) \in EdgeRegion} \left\{ \sqrt{\begin{array}{l}(u0(i, j) + du(i, j) - u0(i, j))^2 + \\ (v0(i, j) + dv(i, j) - v0(i, j) - \beta(u0, v0) * y(u0, v0))^2\end{array}} \right\}$$

Herein, du(i,j) and dv(i,j) are unknowns that need to be solved. When a constraint equation is subsequently solved, it needs to be ensured that this term is as small as possible.

S607. The terminal obtains displacement matrices respectively corresponding to the regions based on the constraint terms and weight coefficients corresponding to the constraint terms.

S608. The terminal obtains a second corrected image through color mapping based on the initial image matrices and the displacement matrices respectively corresponding to the regions, and outputs the second corrected image.

For content of S607 and S608, refer to the description of S506 and S507 in the embodiment in FIG. 9. For brevity of this specification, details are not described herein. The first corrected image in this embodiment is a rectangular image, and therefore the second corrected image obtained in S608 is also a rectangular image, and may be output subsequently without cropping the second corrected image.

It may be learned that in this embodiment of this application, the terminal performs optical distortion correction, to obtain an abnormal-shaped image, crops the abnormal-shaped image into a rectangular image, performs algorithm constraint correction processing on the rectangular image by region (including the head region, the body region, the background region, and the field of view edge region), performs shape correction on the head region and the body region of a portrait based on different projection algorithms, and separately sets independent constraint terms to optimize a solution, to ensure that the portrait is best corrected. For the background region, a position relationship between a background pixel and a pixel in a control region of the background pixel before and after transformation is constrained, to ensure that no background distortion or discontinuity occurs in image content in the background region due to foreground correction. For the field of view edge region, content adaptive boundary control is used, to minimize a content loss caused by cropping and a problem of a field of view loss. Therefore, implementing this embodiment of this application can ensure that after the image is corrected, both the portrait and background content are natural, continuous, and harmonious, and fit a human visual habit. In this way, user experience is greatly improved, and there are great commercial application benefits.

To better understand the foregoing solution, the following describes the solution with reference to an actual application scenario.

Figure 17A:
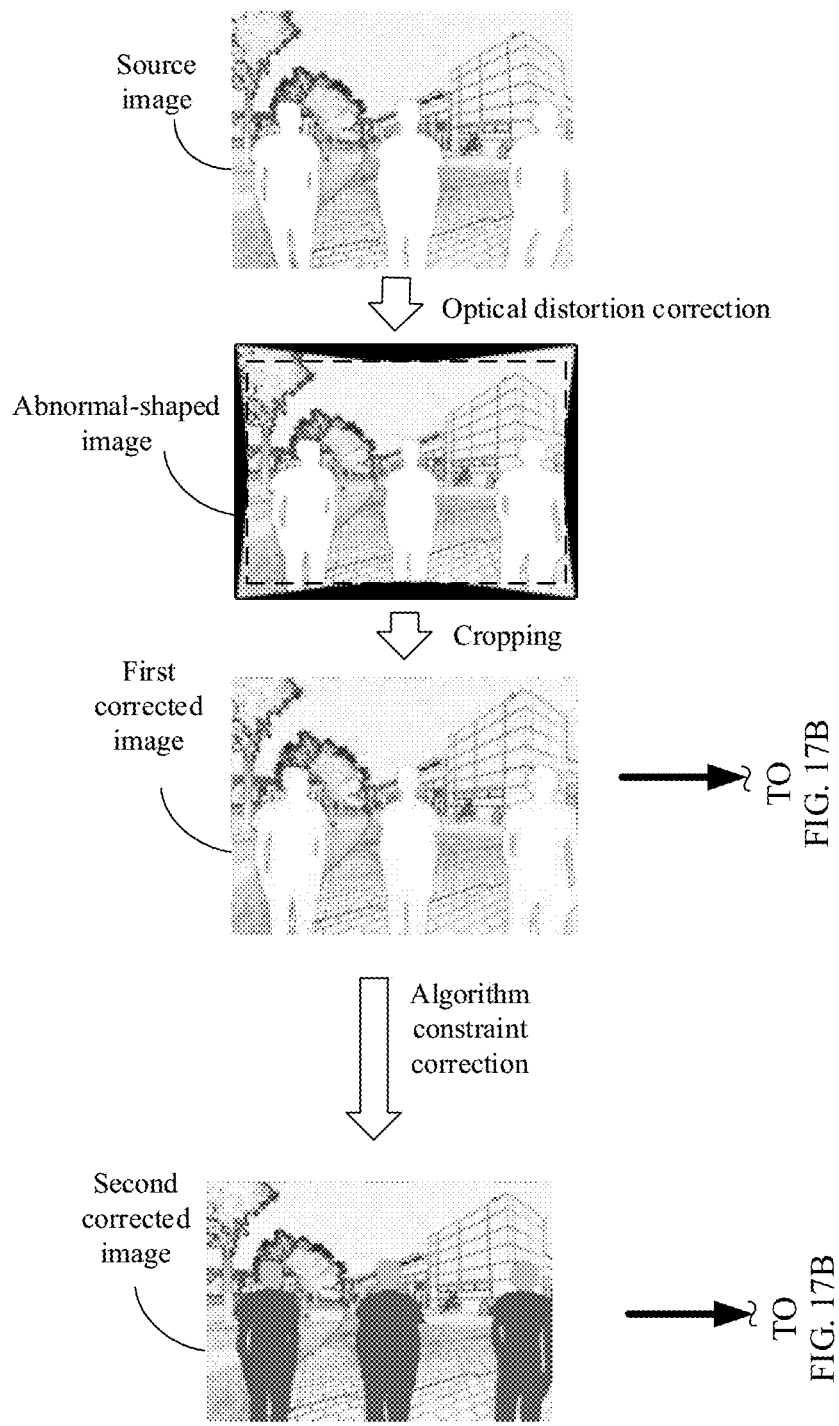
FIG. 17A and FIG. 17B are still another schematic diagram of a processing procedure of an application scenario in which a mobile phone takes a photo according to an embodiment of this application.
Figure 17B:
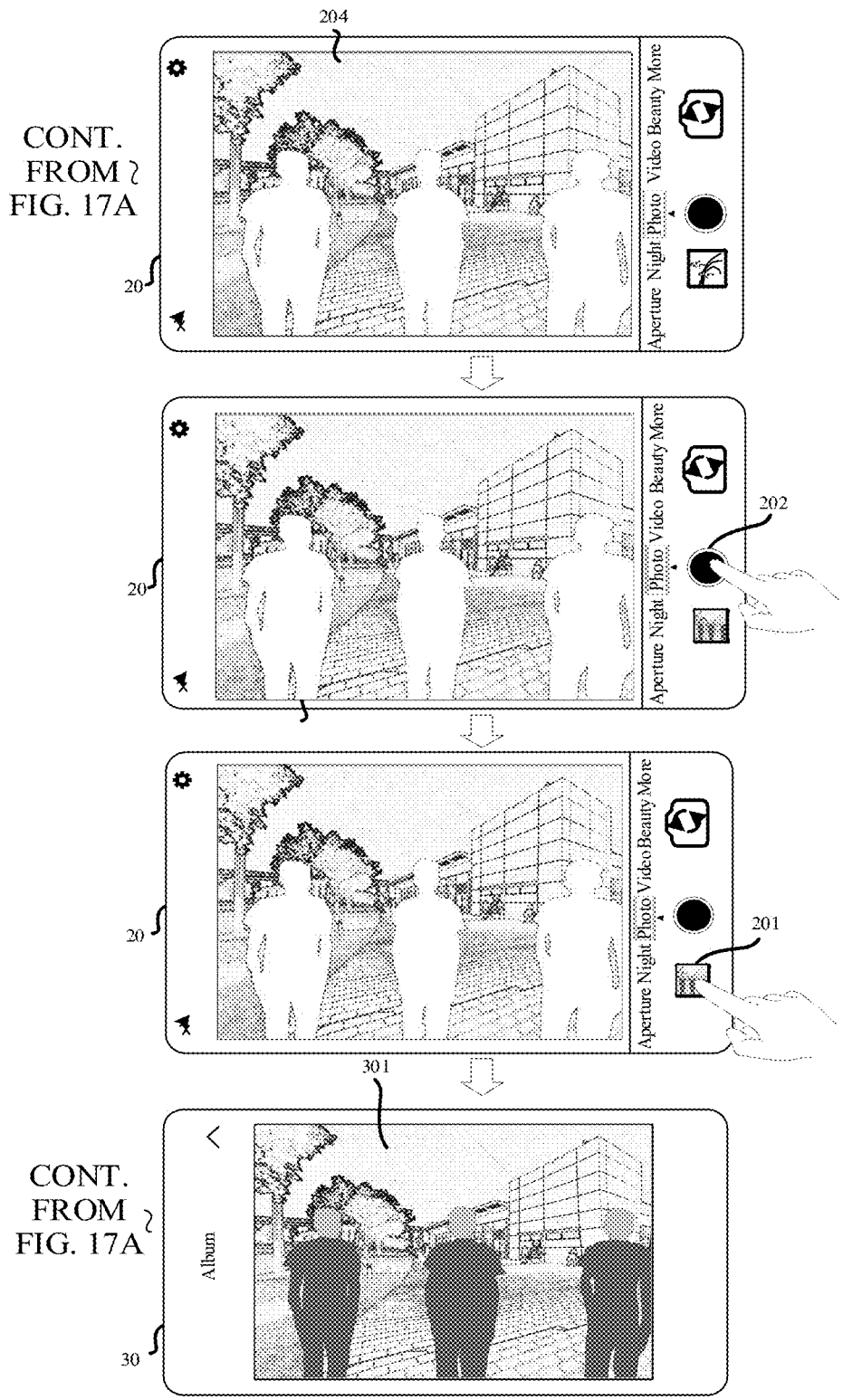

Referring to FIG. 17A and FIG. 17B, in an example scenario, an example in which a terminal is a smartphone is used. When a user needs to take a photo using the mobile phone, the user opens a photographing app in the mobile phone, and a display interface 20 of the photographing app is presented on a display panel of the mobile phone. The photographing app drives a camera apparatus of the mobile phone to collect a source image in real time. Optical distortion correction is performed on the source image in a processor, to obtain an abnormal-shaped image, and the abnormal-shaped image is cropped and enlarged, to obtain a first corrected image in a rectangular form. The first corrected image is displayed in a preview box 204 on the display interface 20. When the user taps a photographing control 202 on the display interface 20, the processor performs algorithm constraint correction on the first corrected image, to obtain a second corrected image in a rectangular form, and stores the second corrected image, for example, stores the second corrected image in an album. In this way, when the user taps an image browsing control 201 on the display interface 20, the mobile phone switches to a display interface 30 of an album app, and displays the rectangular image on the display interface 30. It may be learned that the mobile phone automatically corrects the image, and therefore a correction process is basically not perceived by the user. The user views the rectangular image in the preview box 204, and can view a rectangular image effect with both an excellent portrait effect and an excellent background effect in a timely manner after completing photographing, thereby greatly improving user experience.

It should be noted that the application scenarios shown in FIG. 14A, FIG. 14B, FIG. 17A, and FIG. 17B are merely used to explain the solutions of this application by example rather than limitation. Actually, based on the technical idea and technical solutions of this application, more application presentation solutions may be designed in an actual product.

Figure 18A:
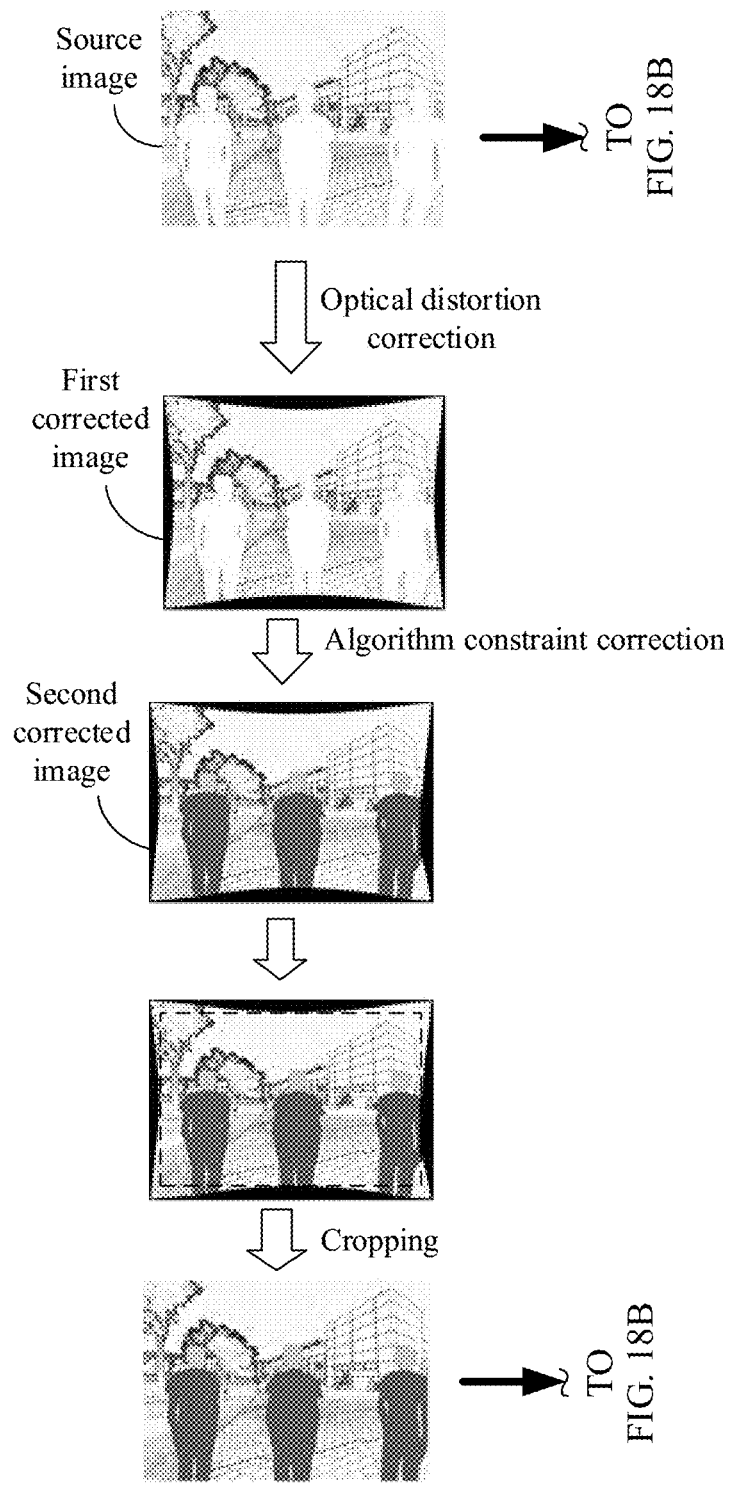
FIG. 18A and FIG. 18B are still another schematic diagram of a processing procedure of an application scenario in which a mobile phone takes a photo according to an embodiment of this application.
Figure 18B:
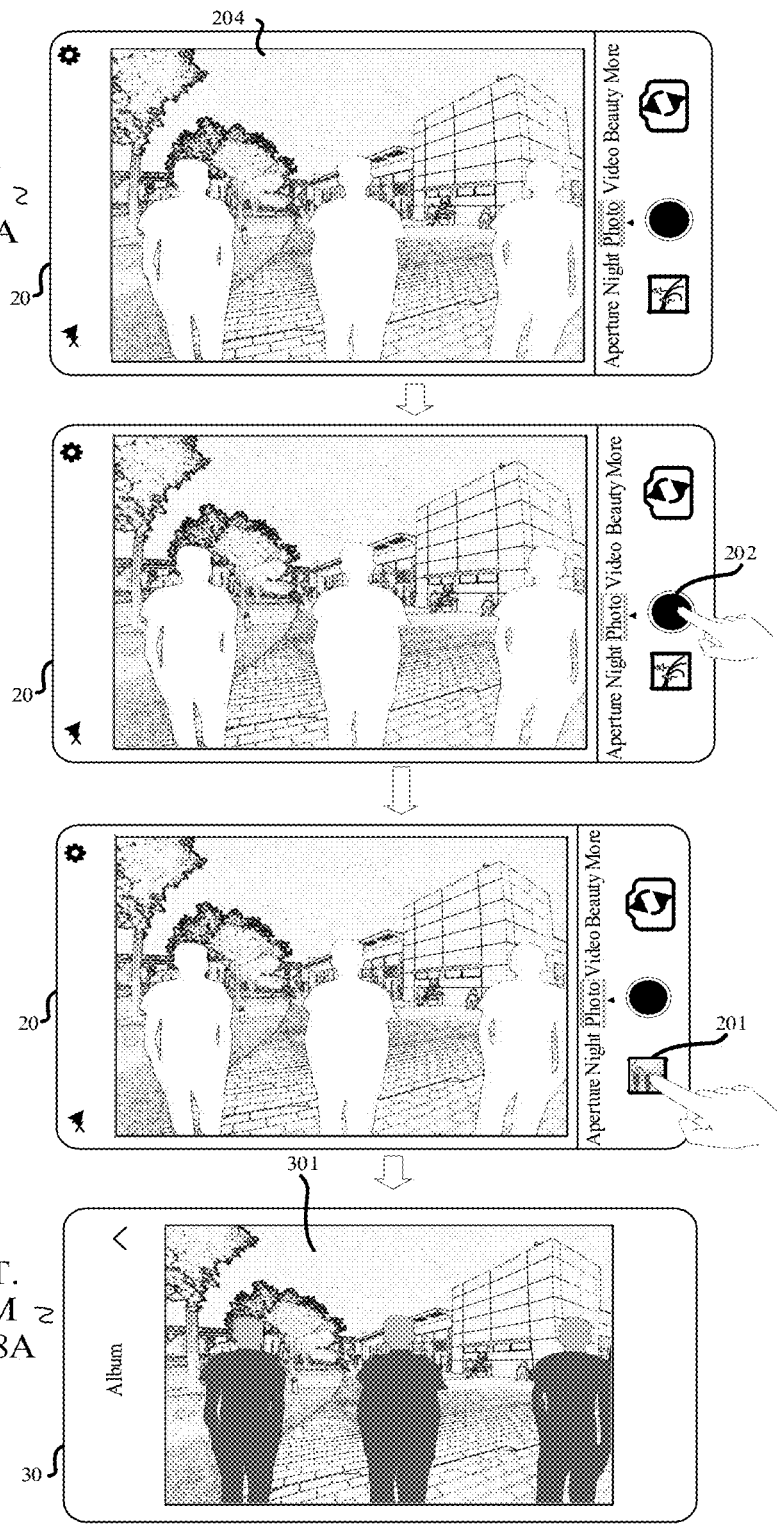

For example, referring to FIG. 18A and FIG. 18B, in still another example scenario, an example in which a terminal is a smartphone is used. When a user needs to take a photo using the mobile phone, the user opens a photographing app in the mobile phone, and a display interface 20 of the photographing app is presented on a display panel of the mobile phone. The photographing app drives a camera apparatus of the mobile phone to collect a source image in real time. The source image is displayed in a preview box 204 on the display interface 20. When the user taps a photographing control 202 on the display interface 20, a processor performs optical distortion correction on the source image, to obtain a first corrected image (the first corrected image may be an abnormal-shaped image or a rectangular image obtained after cropping, and an abnormal-shaped image is used as an example herein). The processor performs algorithm constraint correction on the first corrected image, to obtain a second corrected image, crops and enlarges the second corrected image into a rectangular image, and stores the rectangular image, for example, stores the rectangular image in an album. In this way, when the user taps an image browsing control 201 on the display interface 20, the mobile phone switches to a display interface 30 of an album app, and displays the rectangular image on the display interface 30. It may be learned that the mobile phone automatically corrects the image, and therefore a correction process is basically not perceived by the user. The user views the rectangular image in the preview box 204, and can view a rectangular image effect with both an excellent portrait effect and an excellent background effect in a timely manner after completing photographing, thereby greatly improving user experience.

The foregoing describes a related system architecture and method in the embodiments of the present disclosure. Similarly, the following describes a related apparatus/device in the embodiments of this application.

Figure 19:
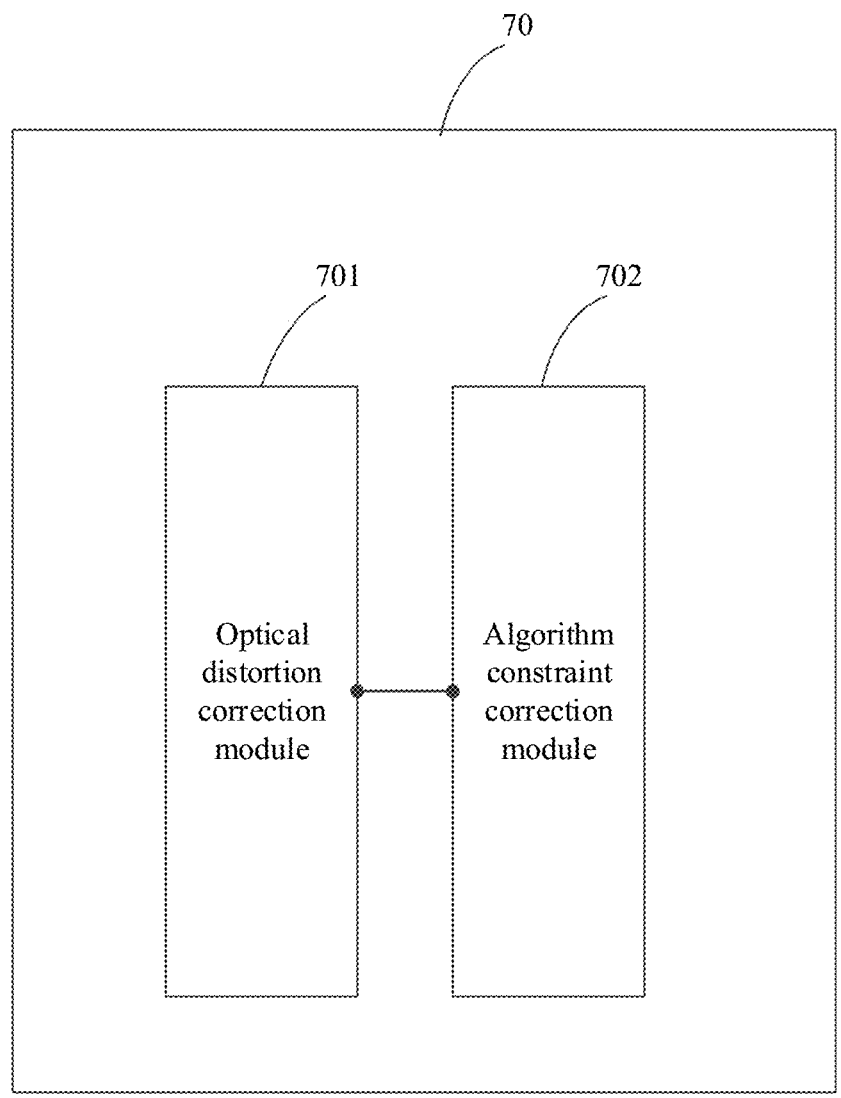
FIG. 19 is a schematic diagram of a structure of an apparatus according to an embodiment of this application.

FIG. 19 is a schematic diagram of a structure of an apparatus 70 according to an embodiment of this application. The apparatus 70 includes an optical distortion correction module 701 and an algorithm constraint correction module 702. In some embodiments, the optical distortion correction module 701 and the algorithm constraint correction module 702 may run in the processor 110 of the terminal 100. In some other embodiments, related functions of the optical distortion correction module 701 and the algorithm constraint correction module 702 may be implemented in the graphics engine of the system library described in the embodiment in FIG. 3.

The optical distortion correction module 701 is configured to perform optical distortion correction on a collected source image, to obtain a first corrected image. The first corrected image includes a portrait in which stretching deformation occurs and a background region. The portrait in which stretching deformation occurs includes at least a first human body region in which stretching deformation occurs and a second human body region in which stretching deformation occurs.

The algorithm constraint correction module 702 is configured to separately process the first human body region, the second human body region, and the background region, to obtain a second corrected image. The first human body region and the second human body region of the portrait in the second corrected image are based on different algorithms to present different deformation amounts, such that the stretching deformation in both the first human body region and the second human body region is corrected, and image content throughout the portrait in the background region in the first corrected image includes no fault in human vision.

The optical distortion correction module 701 and the algorithm constraint correction module 702 may be configured to implement related method steps of the terminal shown in the embodiment in FIG. 7, FIG. 9, or FIG. 15. For brevity of this specification, details are not described herein.

In the foregoing embodiments, descriptions of the embodiments have respective focuses. For a part that is not described in detail in an embodiment, refer to related descriptions in other embodiments.

In the several embodiments provided in this application, it should be understood that the disclosed apparatuses may be implemented in other manners. For example, the described apparatus embodiment is merely an example. For example, division into units is merely division into logical functions and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of this application essentially, or the part contributing to other approaches, or all or some of the technical solutions may be implemented in the form of a software product. The software product is stored in a memory and includes several instructions for instructing a computer device (which may be a personal computer, a server, or a network device) to perform all or some of the steps of the methods described in the embodiments of this application. The foregoing memory includes any medium that can store program code, for example, a USB flash drive, a read-only memory (ROM), a random-access memory (RAM), a removable hard disk, a magnetic disk, or an optical disc.

A person of ordinary skill in the art may understand that all or some of the steps of the methods in the embodiments may be implemented by a program instructing related hardware. The program may be stored in a computer-readable memory. The memory may include a flash memory, a ROM, a RAM, a magnetic disk, an optical disc, or the like.

The embodiments of this application are described in detail above. The principles and implementation of this application are described herein through examples. The description about the embodiments of this application is merely provided to help understand the method and core ideas of this application. In addition, a person of ordinary skill in the art can make variations and modifications to this application in terms of the implementations and application scopes based on the ideas of this application. Therefore, the content of this specification shall not be construed as a limit to this application.

What is claimed is:

1. An image distortion correction method, comprising:
performing optical distortion correction on a collected source image to obtain a first corrected image, wherein the first corrected image comprises a background region, a field of view edge region, and a portrait with stretching deformation, and wherein the portrait comprises at least a first human body region and a second human body region;
performing algorithm constraint correction on the first human body region, the second human body region, and the background region by using constraint terms to obtain a second corrected image, wherein the constraint terms for performing the algorithm constraint correction respectively constrain the first human body region, the second human body region, and the background region;
constructing the constraint terms, wherein the constraint terms further constrain the field of view edge region;
constructing a regular constraint term for the first corrected image;
obtaining displacement matrices respectively corresponding to the first human body region, the second human body region, and the background region based on the constraint terms and the regular constraint term;
obtaining target image matrices respectively corresponding to the first human body region, the second human body region, and the background region based on initial image matrices and the displacement matrices; and
obtaining the second corrected image through color mapping based on the target image matrices and color matrices respectively corresponding to the first human body region, the second human body region, and the background region.

2. The image distortion correction method according to claim 1, wherein performing the algorithm constraint correction to obtain the second corrected image comprises performing the algorithm constraint correction on the first human body region, the second human body region, the background region, and the field of view edge region.

3. The image distortion correction method according to claim 2, wherein the first human body region comprises a head region of the portrait, and wherein the second human body region comprises a body region of the portrait.

4. The image distortion correction method according to claim 3, wherein a constraint term corresponding to the head region is configured to correct stretching deformation in the head region by constraining a target image matrix corresponding to the head region to approximate an image matrix obtained after geometric transformation is performed on a first image matrix, wherein the first image matrix is obtained after an initial image matrix corresponding to the head region is processed by using a spherical projection algorithm, and wherein the geometric transformation comprises at least one of image rotation, image translation, or image scaling.

5. The image distortion correction method according to claim 3, wherein a constraint term corresponding to the body region is configured to correct stretching deformation occurring in the body region by constraining a target image matrix corresponding to the body region to approximate an image matrix obtained after geometric transformation is performed on a second image matrix, wherein the second image matrix is obtained after an initial image matrix corresponding to the body region is processed by using a Mercator projection algorithm, and wherein the geometric transformation comprises at least one of image rotation, image translation, or image scaling.

6. The image distortion correction method according to claim 1, wherein a constraint term corresponding to the background region is configured to constrain a pixel in an initial image matrix corresponding to the background region to be displaced and a first vector corresponding to the pixel before displacement and a second vector corresponding to the pixel after displacement to be parallel to each other, wherein the first vector represents a vector between the pixel before displacement and a first neighboring pixel corresponding to the pixel before displacement, and wherein the second vector represents a vector between the pixel after displacement and a second neighboring pixel corresponding to the pixel after displacement.

7. The image distortion correction method according to claim 1, wherein the regular constraint term is configured to constrain a difference between any two of the displacement matrices to be less than a preset threshold.

8. The image distortion correction method according to claim 1, wherein a constraint term corresponding to the field of view edge region is configured to constrain a pixel in an initial image matrix corresponding to the field of view edge region to be displaced along an edge of the first corrected image.

9. The image distortion correction method according to claim 1, wherein a constraint term corresponding to the field of view edge region is configured to constrain a pixel in an initial image matrix corresponding to the field of view edge region to be displaced towards an outer side of the first corrected image.

10. The image distortion correction method according to claim 1, wherein the first corrected image is a non-rectangular image, and wherein after obtaining the second corrected image, the image distortion correction method further comprises cropping the second corrected image to obtain a rectangular image.

11. The image distortion correction method according to claim 1, wherein performing the optical distortion correction to obtain the first corrected image comprises:
performing optical distortion correction on the collected source image to obtain a non-rectangular image; and
cropping the non-rectangular image into a rectangular image, wherein the first corrected image is the rectangular image.

12. The image distortion correction method according to claim 1, wherein a first image area occupied by the first human body region is positively correlated with a first weight coefficient corresponding to a first constraint term of the first human body region, and wherein a second image area occupied by the second human body region is positively correlated with a second weight coefficient corresponding to a second constraint term of the second human body region.

13. The image distortion correction method according to claim 12, wherein a first field of view of the first human body region is positively correlated with the first weight coefficient, and wherein a second field of view of the second human body region is positively correlated with the second weight coefficient.

14. The image distortion correction method according to claim 1, wherein texture significance of the background region is positively correlated with a weight coefficient corresponding to a constraint term of the background region.

15. The image distortion correction method according to claim 2, wherein a first weight coefficient corresponding to a first constraint term of the field of view edge region when there is portrait content in the field of view edge region is greater than a second weight coefficient corresponding to a second constraint term of the field of view edge region when there is no portrait content in the field of view edge region.

16. A terminal device, comprising:
one or more processors; and
a memory coupled to the one or more processors, wherein the memory is configured to store one or more instructions, which when executed by the one or more processors, cause the terminal device to be configured to:
perform optical distortion correction on a collected source image to obtain a first corrected image, wherein the first corrected image comprises a background region, a field of view edge region, and a portrait with stretching deformation, and wherein the portrait comprises at least a first human body region and a second human body region; and
perform algorithm constraint correction on the first human body region, the second human body region, and the background region by using constraint terms to obtain a second corrected image, wherein the constraint terms for performing the algorithm constraint correction respectively constrain the first human body region, the second human body region, and the background region;
construct the constraint terms, wherein the constraint terms further constrain the field of view edge region;
construct a regular constraint term for the first corrected image;
obtain displacement matrices respectively corresponding to the first human body region, the second human body region, and the background region based on the constraint terms and the regular constraint term;
obtain target image matrices respectively corresponding to the first human body region, the second human body region, and the background region based on initial image matrices and the displacement matrices; and
obtain the second corrected image through color mapping based on the target image matrices and color matrices respectively corresponding to the first human body region, the second human body region, and the background region.

17. The terminal device according to claim 16, wherein the terminal device is configured to perform the algorithm constraint correction to obtain the second corrected image by performing the algorithm constraint correction on the first human body region, the second human body region, the background region, and the field of view edge region.

18. The terminal device according to claim 17, wherein the first human body region comprises a head region of the portrait, wherein the second human body region comprises a body region of the portrait.

19. The terminal device according to claim 18, wherein a constraint term corresponding to the head region is configured to correct stretching deformation in the head region by constraining a target image matrix corresponding to the head region to approximate an image matrix obtained after geometric transformation is performed on a first image matrix, wherein the first image matrix is obtained after an initial image matrix corresponding to the head region is processed by using a spherical projection algorithm, and wherein the geometric transformation comprises at least one of image rotation, image translation, or image scaling.

20. The terminal device according to claim 16, wherein the regular constraint term is configured to constrain a difference between any two of the displacement matrices to be less than a preset threshold.

* * * * *

UNITED STATES PATENT AND TRADEMARK OFFICE
CERTIFICATE OF CORRECTION

| | | |
|---|---|---|
| PATENT NO. | : 12,254,635 B2 | Page 1 of 1 |
| APPLICATION NO. | : 17/698650 | |
| DATED | : March 18, 2025 | |
| INVENTOR(S) | : Chen Su et al. | |

It is certified that error appears in the above-identified patent and that said Letters Patent is hereby corrected as shown below:

On the Title Page

Page 2, item (56) References Cited, Foreign Patent Documents: "IN 107665477 A 2/2018" should read "CN 107665477 A 2/2018"

Signed and Sealed this
Sixth Day of May, 2025

Coke Morgan Stewart
*Acting Director of the United States Patent and Trademark Office*